US009529317B2

(12) United States Patent
Shimizu et al.

(10) Patent No.: US 9,529,317 B2
(45) Date of Patent: Dec. 27, 2016

(54) BLADE AND IMAGE FORMING APPARATUS INCORPORATING SAME

(71) Applicants: Eisuke Shimizu, Tokyo (JP); Kazuhiko Watanabe, Tokyo (JP); Takaaki Tawada, Kanagawa (JP); Hisashi Kikuchi, Kanagawa (JP)

(72) Inventors: Eisuke Shimizu, Tokyo (JP); Kazuhiko Watanabe, Tokyo (JP); Takaaki Tawada, Kanagawa (JP); Hisashi Kikuchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/857,955

(22) Filed: Sep. 18, 2015

(65) Prior Publication Data

US 2016/0109846 A1 Apr. 21, 2016

(30) Foreign Application Priority Data

Oct. 21, 2014 (JP) ................................ 2014-214335
Dec. 3, 2014 (JP) ................................ 2014-244926

(51) Int. Cl.

| | |
|---|---|
| ***G03G 21/00*** | (2006.01) |
| ***B08B 1/00*** | (2006.01) |
| ***B32B 27/08*** | (2006.01) |
| ***B32B 27/40*** | (2006.01) |
| ***B32B 7/02*** | (2006.01) |
| *G03G 15/16* | (2006.01) |

(52) U.S. Cl.

CPC .......... *G03G 21/0017* (2013.01); *B08B 1/006* (2013.01); *B32B 7/02* (2013.01); *B32B 27/08* (2013.01); *B32B 27/40* (2013.01); *B32B 2307/51* (2013.01); *B32B 2307/536* (2013.01); *B32B 2432/00* (2013.01); *G03G 15/161* (2013.01); *G03G 2215/0132* (2013.01)

(58) Field of Classification Search

CPC ........................ G03G 21/0017; G03G 21/0011
See application file for complete search history.

(56) References Cited

U.S. PATENT DOCUMENTS

| | | | | |
|---|---|---|---|---|
| 2005/0254868 A1 | 11/2005 | Naruse et al. | | |
| 2006/0216084 A1* | 9/2006 | Kojima | G03G 21/0017 | 399/350 |
| 2007/0140762 A1* | 6/2007 | Ueno | G03G 21/0017 | 399/350 |
| 2007/0281237 A1* | 12/2007 | Iwamoto | G03G 9/08755 | 430/123.5 |
| 2008/0080914 A1* | 4/2008 | Sugimoto | G03G 21/0017 | 399/350 |

(Continued)

FOREIGN PATENT DOCUMENTS

| | | |
|---|---|---|
| JP | 2013-076970 | 4/2013 |
| JP | 2014-066767 | 4/2014 |

OTHER PUBLICATIONS

U.S. Appl. No. 14/730,957, filed Jun. 4, 2015.

*Primary Examiner* — Sandra Brase
(74) *Attorney, Agent, or Firm* — Harness, Dickey & Pierce, P.L.C.

(57) ABSTRACT

An elastic blade includes an edge layer and at least one backup layer laminated on the edge layer. The edge layer includes a contact edge to contact a contact object and an opposing face to oppose the contact object, and the backup layer is greater in elastic power than the edge layer.

15 Claims, 5 Drawing Sheets

3
5
7
63
6
62
61

(56) References Cited

U.S. PATENT DOCUMENTS

| | | | | |
|---|---|---|---|---|
| 2009/0154971 | A1* | 6/2009 | Itoh | G03G 9/0819 399/350 |
| 2010/0061780 | A1* | 3/2010 | Sugiyama | G03G 21/0029 399/350 |
| 2013/0243506 | A1* | 9/2013 | Ikuno | G03G 21/1814 399/350 |
| 2014/0086655 | A1* | 3/2014 | Kojima | G03G 21/0011 399/350 |
| 2014/0161501 | A1 | 6/2014 | Watanabe et al. | |
| 2014/0193172 | A1 | 7/2014 | Tawada et al. | |
| 2014/0233998 | A1 | 8/2014 | Watanabe et al. | |
| 2014/0341629 | A1 | 11/2014 | Watanabe et al. | |

* cited by examiner

PERIPHERAL LENGTH: L1
PROJECTED AREA: S

AREA: S
PERIPHERAL LENGTH: L2

BLADE AND IMAGE FORMING APPARATUS INCORPORATING SAME

CROSS-REFERENCE TO RELATED APPLICATIONS

This patent application is based on and claims priority pursuant to 35 U.S.C. §119(a) to Japanese Patent Application Nos. 2014-214335, filed on Oct. 21, 2014, and 2014-244926, filed on Dec. 3, 2014, in the Japan Patent Office, the entire disclosure of each of which is hereby incorporated by reference herein.

BACKGROUND

Technical Field

Embodiments of the present invention generally relate to a blade and an image forming apparatus, such as a copier, a printer, a facsimile machine, or a multifunction peripheral (or multifunction machine) having at least two of copying, printing, facsimile transmission, plotting, and scanning capabilities, that includes the blade.

Description of the Related Art

In electrophotographic image forming apparatuses, after a toner image is transferred from a surface of an image bearer such as a photoconductor onto a transfer sheet or an intermediate transfer member, a cleaning device removes toner remaining on the surface of the image bearer.

Cleaning devices employing a cleaning blade are widely used for simplicity in structure and high cleaning capability.

SUMMARY

An embodiment of the present invention provides an elastic blade that includes an edge layer and at least one backup layer laminated on the edge layer. The edge layer includes a contact edge to contact a contact object and an opposing face to oppose the contact object, and the backup layer is greater in elastic power than the edge layer In another embodiment, a cleaning device includes the blade described above and a pressing device to press the blade to the contact object such that pressure of contact of the blade with the contact object is kept constant.

In yet another embodiment, an image forming apparatus includes a charger to charge a surface of an image bearer, an exposure device to expose the surface of the charged image bearer to form an electrostatic latent image thereon, a developing device to develop the latent image with toner into a toner image, a transfer device to transfer the toner image onto a recording medium, a fixing device to fix the toner image on the recording medium, and a cleaning device to remove toner from the image bearer. The cleaning device includes the blade described above.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
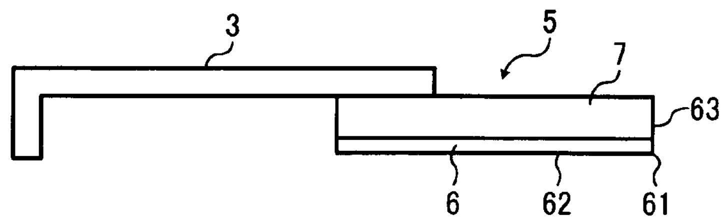
FIG. 1 is a cross-sectional view of a cleaning blade according to an embodiment.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, a blade according to an embodiment of the present invention is described.

FIG. 1 is a cross-sectional view of a cleaning blade 5, serving as a blade according to the present embodiment.

The cleaning blade 5 illustrated in FIG. 1 is elastic. As illustrated in FIG. 1, a support 3 supports a base end of the cleaning blade 5 such that an edge 61, which is a ridgeline or a corner at an end opposite the base end, abuts or contacts a surface of an object to be cleaned by the cleaning blade 5 (hereinafter "contact object"). The cleaning blade 5 is double-layered and includes an edge layer 6, which includes the edge 61, and a backup layer 7 laminated on the edge layer 6. In FIG. 1, reference numeral 62 represents an opposing face positioned opposing the contact object, and 63 represents an end face adjoining the opposing face 62 via the edge 61.

The edge layer 6 and the backup layer 7 are made of elastic materials different in elastic power from each other. In the present embodiment, the backup layer 7 is made of urethane rubber higher in elastic power than the material of the edge layer 6, and the backup layer 7 is greater in thickness than the edge layer 6.

There are single-layer cleaning blades made of polyurethane rubber lower in hardness and having an elastic power of about 90% at or around the edge and a Martens hardness of about 0.7 N/mm$^2$. If a material lower in elastic power is used for such single-layer cleaning blades, in deformation of the cleaning blade upon application of force, the rate of plastic deformation is greater than the rate of elastic deformation. If the rate of plastic deformation is greater than the rate of elastic deformation, the cleaning blade fatigues, and the cleaning capability is reduced.

In the present embodiment, the cleaning blade 5 is multilayered and includes the edge layer 6 and the backup layer 7, and the backup layer 7 is higher in elastic power than the edge layer 6. With this configuration, regarding plastic deformation caused by force of bending or compression applied to the cleaning blade 5, the amount of plastic deformation of the backup layer 7 is smaller than the amount of plastic deformation of the edge layer 6. Additionally, in the present embodiment, the edge layer 6 and the backup layer 7 affect, at identical or similar degrees per unit thickness, deformation of the entire cleaning blade 5, and the backup layer 7 is thicker than the edge layer 6. Accordingly, deformation of the backup layer 7 is dominant in deformation of the entire cleaning blade 5. Accordingly, fatigue of the entire cleaning blade 5 is suppressed by keeping the amount of plastic deformation of the backup layer 7 smaller than the amount of plastic deformation of the edge layer 6.

Additionally, when a single-layer cleaning blade is made of a material higher in elastic power, micro vibration arises at the edge of the cleaning blade due to the sliding between the cleaning blade and the contact object. It is possible that the vibration at the edge coincides with an eigenfrequency of the cleaning blade and grows, causing noise.

In the cleaning blade 5 according to the present embodiment, the edge layer 6, which includes the edge 61 to contact the contact object directly, is lower in elastic power than the backup layer 7. With this structure, when the vibration of the edge layer 6 is about to grow, the backup layer 7 is capable of isolating vibration. Specifically, since the backup layer 7 is contactless with the contact object and made of the material higher in elastic power than the edge layer 6, the backup layer 7 absorbs vibration and serves as a vibration isolator. Accordingly, the backup layer 7 suppresses the occurrence of noise inherent to micro vibration of the edge 61 caused by the sliding with the contact object.

Figure 2A:
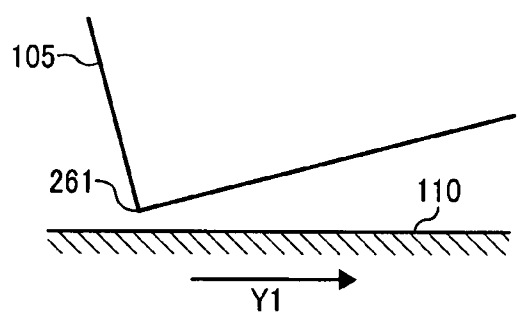
FIGS. 2A and 2B are illustrations of vibration of an edge of a single-layer cleaning blade.
Figure 2B:
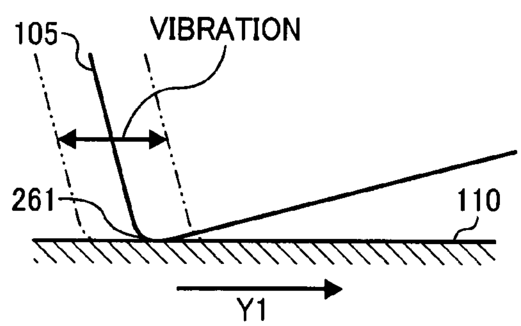

FIGS. 2A and 2B are illustrations of a single-layer cleaning blade known to the inventors, as a comparative example.

Referring to FIG. 2A, an edge 261 of a cleaning blade 105 abuts or contacts a surface of a contact object 110 that moves in the direction indicated by arrow Y1, and the edge 261 vibrates at that time.

Elastic power is one index of ease of recovery from deformation of rubber when the rubber is deformed with force. If the cleaning blade 105 is higher in elastic power, the edge 261 recovers at a high speed from deformation due to the contact with the contact object 110. Then, as illustrated in FIG. 2B, the edge 261 of the cleaning blade 105 vibrates at a high speed. Accordingly, the vibration of the edge 261 is more likely to coincide with the eigenfrequency of the cleaning blade 105, and the vibration causes noise more easily.

In the cleaning blade 5 according to the present embodiment, the edge layer 6 is lower in elastic power than the backup layer 7. With this structure, the backup layer 7 absorbs the vibration caused by deformation of the edge layer 6, and the vibration frequency of the edge layer 6 less easily coincides with the eigenfrequency of the cleaning blade 5. Accordingly, the occurrence of vibration inherent in recovery from deformation of the edge 61 is inhibited.

When the material lower in elastic power is used for the single-layer cleaning blade, the cleaning blade plastically deforms in a greater amount upon application of force of bending or compression. By contrast, when a material higher in elastic power is used for the single-layer cleaning blade, although the fatigue is inhibited, vibration of the edge of the blade results in noise (chatter). Thus, it is difficult to inhibit both of fatigue of the blade and noise of the blade in the single-layer cleaning blade. Additionally, in multilayer blades, it is preferred to define the relation between the elastic power of the edge layer 6 and that of the backup layer 7 to extend the operational life of the cleaning blade and enhance reliability.

In the multilayer cleaning blade 5, making the backup layer 7 greater in elastic power than the edge layer 6 is advantageous in suppressing the occurrence of noise caused by sliding between the edge of the blade and the contact object and inhibiting fatigue of the blade with elapse of time.

It is to be noted that the difference in elastic power between the edge layer 6 and the backup layer 7 is preferably about from 5% to 50%.

If the difference in elastic power between the edge layer 6 and the backup layer 7 is less than 5%, the difference is too small. In this case, the blade fatigues more easily as the elastic power of the cleaning blade 5 decreases, and noise arises more easily as the elastic power of the cleaning blade 5 increases.

If the difference in elastic power between the edge layer 6 and the backup layer 7 is greater than 50%, inevitably the elastic power of the edge layer 6 is lower. Accordingly, cleaning capability is more likely to decrease due to the plastic deformation of the edge 61.

Although the description above concerns the double-layer cleaning blade 5 including the edge layer 6 and the backup layer 7, aspects of the present specification are not limited thereto. For example, aspects of the present specification include a structure in which the backup layer 7 is multilayered.

Additionally, although the backup layer 7 is made of urethane rubber higher in elastic power than the edge layer 6 in the description above, aspects of the present specification are not limited thereto. As long as the backup layer 7 is higher in elastic power than the edge layer 6, similar effects are available in cases where materials other than urethane rubber are used.

When the backup layer 7, which is higher in elastic power (less easily deforms plastically), is thicker than the edge layer 6, the backup layer 7 is dominant in deformation of the entire cleaning blade 5, and the backup layer 7 inhibits fatigue of the cleaning blade 5. It is to be noted that, if the edge layer 6 is extremely thin, as the edge layer 6 wears due to sliding with the contact object, the backup layer 7 is exposed early. Then, the backup layer 7 higher in elastic power contacts the contact object and causes noise. Accordingly, it is preferred that the edge layer 6 have a thickness sufficient for preventing exposure of the backup layer 7 even when the edge layer 6 wears.

Next, experiment to verify the effects of the present embodiment are described below.

Experiment 1

In Experiment 1, cleaning blades different in layer structure, elastic power, and Martens hardness were evaluated.

[Elastic Power]

The elastic power of the edge 61 of the cleaning blade 5 was measured using a micro hardness measuring system, FISCHERSCOPE® HM2000, from Fischer Technology, Inc, as follows. Push a Vickers penetrator in the cleaning blade 5 at 20 μm from the edge (ridgeline), with a strength of 1.0 mN for 10 seconds, keep that state for 5 seconds, and gradually draws out the Vickers penetrator in 10 seconds. Then, measure the elastic power.

Figure 3:
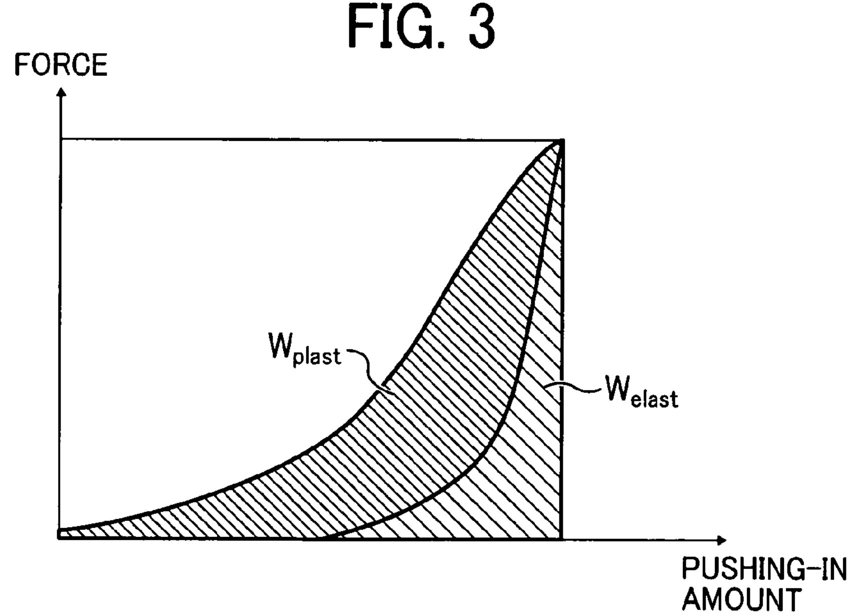
FIG. 3 is a graph of cumulative stress caused while a Vickers penetrator is pushed in, and cumulative stress in removal of a test load.

The elastic power is a characteristic value defined as $W_{elast}/W_{plast} \times 100\%$, wherein $W_{plast}$ represents the cumulative stress caused while the Vickers penetrator is pushed in, and $W_{elast}$ represents cumulative stress caused in removal of the test load (see FIG. 3). FIG. 3 is a graph of the cumulative stress Wplast while the Vickers penetrator is pushed in, and the cumulative stress Welast in removal of the test load. In FIG. 3, the abscissa represents the amount by which the penetrator is pushed in (i.e., pushing-in amount), the ordinate represents the strength of the force.

As the elastic power increases, the rate of plastic power in the period from application of force to distort the material to remove the load becomes smaller. That is, the rate of plastic deformation of rubber deformed by force is smaller.

Figure 4:
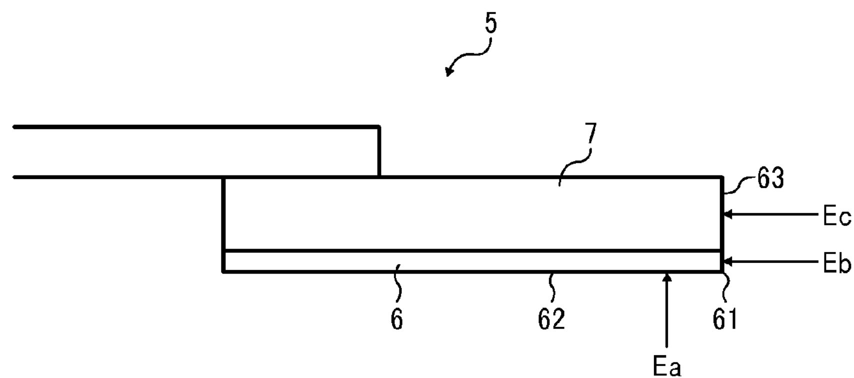
FIG. 4 is an illustration of measurement of elastic power and Martens hardness of an edge of the cleaning blade according to an embodiment.

FIG. 4 is an illustration of measurement of the elastic power and the Martens hardness of the edge layer 6 of the cleaning blade 5.

As illustrated in FIG. 4, the cleaning blade 5 includes the opposing face 62 including the edge 61, and the end face 63 including the edge 61 and adjoining the opposing face 62. The opposing face is disposed opposing the contact object.

In the double-layer cleaning blade 5, if the edge layer 6 is extremely thin relative to the backup layer 7, it is possible that the measured elastic power is affected by the elastic power of the backup layer 7 when the elastic power of the edge layer 6 is measured from the opposing face 62.

For example, in measurement of the elastic power of the edge layer 6 lower than the elastic power of the backup layer 7, if affected by the elastic power of the backup layer 7, the measurement value of elastic power of the edge layer 6 is higher than the measurement value obtained by measuring the elastic power of the material used for the edge layer 6 alone.

The inventors have found that, even if the edge layer 6 is extremely thin relative to the backup layer 7, the elastic power of the edge layer 6 can be measured with a higher degree of accuracy in the following method.

Referring to FIG. 4, define the elastic power of the edge layer 6 measured from the opposing face 62 (in the direction indicated by arrow Ea) as Elastic power A, define the elastic power of the edge layer 6 measured from the end face 63 (in the direction indicated by arrow Eb) as Elastic power B, and define the elastic power of the backup layer 7 measured from the end face 63 (in the direction indicated by arrow Ec) as Elastic power C. Calculate the difference between Elastic power A and Elastic power C, and that between Elastic power B and Elastic power C. Then, determine, the greater of Elastic power A or Elastic power B in absolute value of the difference with Elastic power C, as the elastic power of the edge layer 6. That is, when the absolute value of the difference between Elastic power A and Elastic power C is greater than the difference between Elastic power B and Elastic power C, Elastic power A is defined as the elastic power of the edge layer 6. When the difference between Elastic power B and Elastic power C is greater than the difference between Elastic power A and Elastic power C, Elastic power B is defined as the elastic power of the edge layer 6.

Table 1 shows the elastic power measured by this method.

Descriptions are given below of the configuration of the image forming apparatus used in the experiments and evaluation items.

(Cleaning Capability Under Cool and Dry Conditions)

Figure 6:
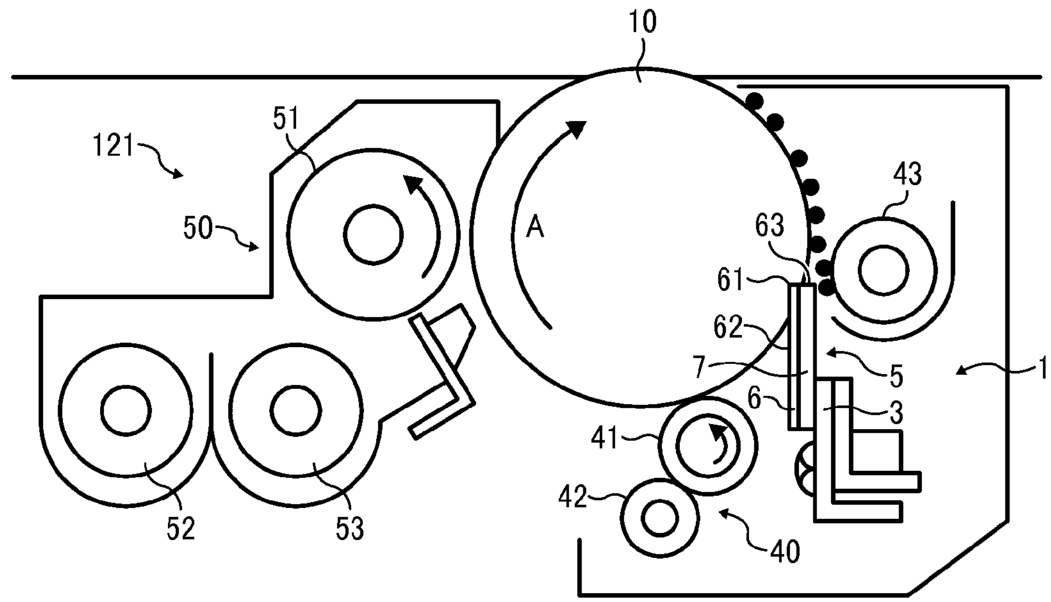
FIG. 6 is a schematic cross-sectional view illustrating a process cartridge installable in the image forming apparatus illustrated in FIG. 5.

In the experiment, a Ricoh image forming apparatus, MP C3503, was used as a test machine, and the cleaning blade 5 of a process cartridge 121 illustrated in FIG. 6 was replaced with those according to Configurations 1 through 14 and Comparative examples 1 through 10.

Under cool and dry (low temperature and low humidity) conditions, defective cleaning is likely to occur. After the test machine was left unused for 24 houses under low temperature (10° C.) and low humidity (15%) conditions, images were output on 80,000 sheets consecutively under the temperature of 10° C. and the humidity of 15%. To input a greater amount of toner to a photoconductor (image bearer), a solid image extending entirely A4 size was input. The output sheets were checked for a trace of defective cleaning with eyes and evaluated as follows.

Good: Cleaning capability is good. After output of 80,000 sheets, the trace of defective cleaning is not observed on the sheets, and practically there are no problems.

Defective: The trace of defective cleaning is visible. After output of 80,000 sheets, the trace of defective cleaning is observed on the sheets, and practically the outputs images are deemed substandard.

(Noise)

The Ricoh image forming apparatus, MP C3503, was used as the test machine, and the cleaning blade 5 of the process cartridge 121 illustrated in FIG. 6 was replaced with those according to Configurations 1 through 14 and Comparative examples 1 through 10.

Using the test machine, 40,000 sheets of A4 size were consecutively fed under a temperature of 23° C. and a humidity of 50% as ordinary room conditions, and an image having an image area ratio of 5% (an average image area ratio in use of products) was printed. While the sheets were fed, the occurrence of noise was checked with ears and evaluated as follows.

None: No noticeable noise in feeding of 40, 000 sheets.

Occurred: Noticeable noise is recognized in feeding of 40, 000 sheets.

(Fatigue of Blade)

The Ricoh image forming apparatus, MP C3503, was used as the test machine, and the cleaning blade 5 of the process cartridge 121 illustrated in FIG. 6 was replaced with those according to Configurations 1 through 14 and Comparative examples 1 through 10.

Using the test machine, the blade edge contact pressure was measured before and after the cleaning blade was kept in contact with the image bearer for seven days (168 hours) under a temperature of 23° C. and a humidity of 50% (ordinary room conditions). The cleaning blade was kept in contact with the image bearer, and changes in contact pressure occurring by keeping the cleaning blade under the pressure were evaluated. The contact pressure with which the cleaning blade contacts the image bearer was 20 g/cm.

Effects of fatigue of the cleaning blade on the cleaning capability were evaluated as follows under a condition of high charging current.

Not affected: Reduction in line pressure is smaller than 4.0 g/cm (20% of line pressure setting). No effects on the cleaning capability.

Affected: Reduction in line pressure is equal to or greater than 4.0 g/cm (20% of line pressure setting). Cleaning capability was affected.

Evaluation results of configurations according to the present embodiment and the comparative examples are shown in Table 1 below. In Table 1, E1 through E14 represents Configurations 1 through 14, and C1 through C10 represents Comparative examples 1 through 10.

TABLE 1

| | Blade structure | Elastic power (%) Edge layer | Backup layer | Cleaning capability under cool and dry conditions | Fatigue of blade: Effects on cleaning | Line pressure change (g/cm) | Noise |
|---|---|---|---|---|---|---|---|
| E1 | Double layer | 82 | 91 | Good | Not affected | 2.3 | None |
| E2 | Double layer | 79 | 85 | Good | Not affected | 2.6 | None |
| E3 | Double layer | 75 | 81 | Good | Not affected | 3.1 | None |
| E4 | Double layer | 72 | 89 | Good | Not affected | 2.8 | None |
| E5 | Double layer | 69 | 92 | Good | Not affected | 2.1 | None |
| E6 | Double layer | 67 | 85 | Good | Not affected | 2.3 | None |
| E7 | Double layer | 65 | 87 | Good | Not affected | 2.8 | None |
| E8 | Double layer | 62 | 82 | Good | Not affected | 3.0 | None |
| E9 | Double layer | 58 | 92 | Good | Not affected | 2.6 | None |
| E10 | Double layer | 52 | 85 | Good | Not affected | 3.2 | None |
| E11 | Double layer | 48 | 71 | Good | Not affected | 3.1 | None |
| E12 | Double layer | 46 | 80 | Good | Not affected | 3.2 | None |
| E13 | Double layer | 43 | 75 | Good | Not affected | 3.3 | None |
| E14 | Double layer | 40 | 70 | Good | Not affected | 3.5 | None |
| C1 | Single layer | 92 | | Good | Not observed | 3.9 | Occurred |
| C2 | Single layer | 38 | | Defective | Affected | 5.9 | None |
| C3 | Double layer | 92 | 68 | Defective | Affected | 5.2 | Occurred |
| C4 | Double layer | 87 | 59 | Defective | Affected | 5.6 | Occurred |
| C5 | Double layer | 82 | 52 | Defective | Affected | 5.8 | Occurred |
| C6 | Double layer | 78 | 48 | Defective | Affected | 6.5 | Occurred |
| C7 | Double layer | 30 | 80 | Defective | Not affected | 3.0 | None |
| C8 | Double layer | 35 | 85 | Defective | Not affected | 2.2 | None |
| C9 | Double layer | 39 | 60 | Defective | Affected | 5.9 | None |
| C10 | Double layer | 30 | 50 | Defective | Affected | 6.5 | None |

(Configuration 1)

In Configurations 1 (E1 in Table 1), the double-layer cleaning blade 5 including the edge layer 6 (0.5 mm in thickness) and the backup layer 7 (1.3 mm in thickness) illustrated in FIG. 1 was used.

In Configuration 1, the elastic power of the edge layer 6 is 82%, and the elastic power of the backup layer 7 is 91%, which is higher than that of the edge layer 6.

In Configuration 1, regarding the fatigue evaluation, the line pressure was reduced by 2.3 g/cm while the cleaning blade 5 was kept in contact with the image bearer (contact object) for 168 hours. The line pressure reduction of Configuration 1 is smaller than a specified line pressure reduction of 4.0 g/cm (20% of line pressure setting), which is deemed to cause defective cleaning in MP C3503. The line pressure reduction of Configuration 1 did not affect the cleaning capability.

It is conceivable that the fatigue to cause defective cleaning is inhibited as follows.

In Configuration 1, since the backup layer 7 is higher in elastic power than the edge layer 6, the amount of plastic deformation of the backup layer 7, which arises when the cleaning blade 5 is bent or compressed with force, is smaller than the amount of plastic deformation of the edge layer 6. In Configuration 1, the edge layer 6 and the backup layer 7 are identical or similar to each other in the degree of effect, per unit thickness, on deformation of the entire cleaning blade 5, and the backup layer 7 is thicker than the edge layer 6. Accordingly, deformation of the backup layer 7 is dominant in deformation of the entire cleaning blade 5. Accordingly, fatigue of the entire cleaning blade 5 is suppressed by keeping the amount of plastic deformation of the backup layer 7 smaller than the amount of plastic deformation of the edge layer 6.

Additionally, in Configuration 1, since the edge layer 6, which includes the edge 61 to contact the contact object directly, is lower in elastic power than the backup layer 7, when the vibration of the edge layer 6 is about to grow, the backup layer 7 exhibits vibration isolating capability. Accordingly, the occurrence of noise inherent to micro vibration of the edge 61, which is caused by the sliding with the contact object, is inhibited.

Further, since the edge layer 6 is lower in elastic power than the backup layer 7, the backup layer 7 absorbs the vibration caused by deformation of the edge layer 6, and the vibration frequency of the edge layer 6 less easily coincides with the eigenfrequency of the cleaning blade 5. Accordingly, the occurrence of vibration inherent in recovery from deformation of the edge 61 is inhibited.

(Configurations 2 Through 14)

In the cleaning blades 5 according to any of Configurations 2 through 14, the elastic powers of the edge layer 6 and the backup layer 7 are different from those of Configuration 1 as shown in Table 1, and the backup layer 7 is greater in elastic power than the edge layer 6 similar to Configuration 1. In any of Configurations 2 through 14, the occurrence of noise caused by the sliding between the edge 61 of the cleaning blade 5 and the contact object was inhibited, and the fatigue with elapse of time was inhibited. The reason of such an evaluation result is similar to that of Configuration 1, and thus the description is omitted.

Comparative Example 1

Differently from the multilayer cleaning blade 5 according to Configurations 1 through 14, the cleaning blade according to Comparative example 1 is single-layered, and the elastic power of the single-layer cleaning blade is 92%, which is greater than the elastic power of the edge layer 6 in Configurations 1 through 14.

Since the material higher in elastic power was used for the single-layer cleaning blade, the edge of the cleaning blade vibrated (micro vibration) due to the sliding with the photoconductor. The vibration frequency of the edge coincided with the eigenfrequency of the cleaning blade, and noise occurred.

Since the elastic power was higher, the speed of vibration increased, increasing the possibility of occurrence of noise.

Comparative Example 2

Differently from the multilayer cleaning blade 5 according to Configurations 1 through 14, the cleaning blade according to Comparative example 2 is single-layered. The line pressure was reduced by 5.9 g/cm after the single-layer cleaning blade was kept in contact with the photoconductor for 168 hours. This reduction in line pressure is greater than the specified line pressure reduction of 4.0 g/cm (20% of line pressure setting), which is deed to cause defective cleaning in MP C3503. This reduction in line pressure reduction degraded the cleaning capability. The elastic power of the single-layer cleaning blade of Comparative example 2 is 38%, which is smaller than the elastic power of the cleaning blade in Configurations 1 through 14.

Since the material lower in elastic power was used for the single-layer cleaning blade of Comparative example 2, when the cleaning blade is deformed (bent or compressed) by force, the rate of plastic deformation is greater than the rate of elastic deformation. It is conceivable that the cleaning blade fatigued and the cleaning capability was reduced. When the blade fatigues, the line pressure of the cleaning blade to the contact object decreases, or the position or posture of the cleaning blade changes, resulting in defective cleaning.

Comparative Example 3

The cleaning blade used in Configuration 3 is double-layered and includes the edge layer 6 and the backup layer 7, similar to the cleaning blade 5 illustrated in FIG. 1. The edge layer 6 is 0.5 mm and the backup layer 7 is 1.3 mm in thickness. The edge layer 6 has an elastic power of 92%, and the backup layer 7 has an elastic power of 68%, and thus the backup layer 7 is lower in elastic power than the edge layer 6, differently from Configurations 1 through 14.

The line pressure was reduced by 5.2 g/cm after the cleaning blade was kept in contact with the photoconductor for 168 hours. This reduction in line pressure is greater than the specified line pressure reduction of 4.0 g/cm (20% of line pressure setting), which causes defective cleaning in MP C3503. This reduction in line pressure reduction degraded the cleaning capability.

In the cleaning blade according to Comparative example 3, the backup layer 7 is lower in elastic power than the edge layer 6. In Comparative example 3, the edge layer 6 and the backup layer 7 is identical or similar to each other in the degree of effect per unit thickness on the deformation of the entire cleaning blade. The backup layer 7 is thicker than the edge layer 6. Accordingly, deformation of the backup layer 7 is dominant in deformation of the entire cleaning blade. That is, the amount of plastic deformation of the backup layer 7 is greater than the amount of plastic deformation of the edge layer 6. Accordingly, the entire cleaning blade 5 fatigued, and the line pressure decreased, resulting in defective cleaning.

In the cleaning blade according to Comparative example 3, the edge layer 6 is made of the material higher in elastic power than that of the backup layer 7. When the edge of the cleaning blade vibrates (micro vibration) due to the sliding with the photoconductor, the backup layer 7 does not isolate vibration since the backup layer 7 is lower in elastic power than the edge layer 6. Accordingly, in Comparative example 3, the vibration of the edge coincided with the eigenfrequency of the cleaning blade more easily, and the vibration caused noise.

Additionally, if the edge layer 6 is higher in elastic power than the backup layer 7, the edge recovers at a higher speed from deformation due to the contact with the photoconductor, and the edge vibrates at a higher speed. Accordingly, in Comparative example 3, the vibration of the edge coincided with the eigenfrequency of the cleaning blade more easily, thereby increasing the possibility of noise caused by vibration inherent to recovery from deformation.

Comparative Examples 4 Through 6

The cleaning blades used in any of Comparative examples 4 through 6 is different from that of Comparative example 3 only in the elastic powers of the edge layer 6 and the backup layer 7 as shown in Table 1.

The backup layer 7 is lower in elastic power than the edge layer 6, differently from Configurations 1 through 14. Accordingly, in Comparative examples 4 through 6, the line pressure decreased to cause defective cleaning, and noise occurred due to the sliding between the photoconductor and the edge of the cleaning blade. The reason of this evaluation is similar to that of Comparative example 3, and thus the description is omitted.

Comparative Examples 7 and 8

In the cleaning blade used in Comparative example 7 or 8, the backup layer 7 is higher in elastic power than the edge layer 6 similar to Configurations 1 through 14. Accordingly, similar to Configuration 1, the fatigue of the cleaning blade and noise were inhibited.

However, the elastic power of the edge layer 6 is smaller than 40%. Accordingly, micro plastic deformation of the edge of the cleaning blade occurred, and a greater amount of toner and external additives to toner escaped from a gap at the nip between the edge and the photoconductor (contact object). The escaped toner and the additives abraded the edge of the cleaning blade, and the cleaning capability under cool and dry conditions was degraded.

Comparative Examples 9 and 10

In the cleaning blade according to Comparative example 9 or 10, the elastic power of the backup layer 7 is smaller than 70%. If the elastic power of the backup layer 7 is smaller than 70%, the backup layer 7 plastically deforms by bending stress. In the double-layer cleaning blade, the backup layer 7 is greater in thickness than the edge layer 6, and deformation of the backup layer 7 is dominant in deformation of the entire cleaning blade. Accordingly, in Comparative examples 9 and 10, the entire cleaning blade fatigued, and the line pressure decreased, resulting in defective cleaning.

From the evaluation results shown in Table 1, the elastic power of the edge layer 6 is preferably equal to or greater than 40%.

By setting the elastic power of the edge layer 6 to 40% or greater, defective cleaning caused by plastic deformation of the edge 61 is inhibited. If the elastic power of the edge layer 6 is smaller than 40%, as described with reference comparative examples 7 and 8, micro plastic deformation of the edge 61 of the cleaning blade 5 occurs. Then, a greater amount of toner and external additives to toner escape from the gap at the nip between the edge 61 and the photoconductor (contact object). The escaped toner and the additives abrade the edge 61 of the cleaning blade 5, and the cleaning capability under cool and dry conditions is degraded.

Additionally, hardness is generally likely to decrease as elastic power increases. If the elastic power of the edge layer 6 is 90% or greater, the edge layer 6 tends to be low, and it is possible that the edge 61 wears as the edge 61 is drawn in by the photoconductor. Therefore, the elastic power of the edge layer 6 is preferably smaller than 90%.

Additionally, the elastic power of the backup layer 7 is preferably 70% or greater.

By setting the elastic power of the backup layer 7 to 70% or greater, fatigue of the cleaning blade 5 caused by plastic deformation of the backup layer 7 is inhibited.

If the elastic power of the backup layer 7 is smaller than 70%, the backup layer 7 plastically deforms, and the entire cleaning blade 5 fatigues. Then, the line pressure decreases, resulting in defective cleaning.

Although an upper limit is not specified in the elastic power of the backup layer 7 according to the present embodiment, the elastic power of typical urethane rubber is smaller than 95%.

Experiment 2

In Experiment 2, regarding the cleaning blades of Configurations 1 through 4 and Comparative examples 1 through 8 described in Experiment 1, Martens hardness was measured, and the occurrence of filming was evaluated.

[Martens Hardness]

Martens hardness is calculated concurrently with calculation of elastic power. Similar to calculation of elastic power, the Martens hardness is measured as follows. Push a Vickers penetrator in the cleaning blade 5 at 20 μm from the edge (ridgeline), with a strength of 1.0 mN for 10 seconds, keep that state for 5 seconds, and gradually draws out the Vickers penetrator in 10 seconds. Then, measure the Martens hardness.

As illustrated in FIG. 4, in the double-layer cleaning blade 5, if the edge layer 6 is extremely thin compared with the backup layer 7, it is possible that the measurement value is affected by the Martens hardness of the backup layer 7 when the Martens hardness of the edge layer 6 is measured from the opposing face 62.

For example, in measurement of the Martens hardness of the edge layer 6 higher than the Martens hardness of the backup layer 7, if affected by the Martens hardness of the backup layer 7, the measured Martens hardness of the edge layer 6 is lower than the measurement value obtained by measuring the Martens hardness of the material used for the edge layer 6 alone.

The inventors have found that, even if the edge layer 6 is extremely thin compared with the backup layer 7, the Martens hardness of the edge layer 6 can be measured with a higher degree of accuracy in the following method.

Referring to FIG. 4, define the Martens hardness of the edge layer 6 measured from the opposing face 62 (in the direction indicated by arrow Ea) as Martens hardness A, define the Martens hardness of the edge layer 6 measured from the end face 63 (in the direction indicated by arrow Eb) as Martens hardness B, and define the Martens hardness of the backup layer 7 measured from the end face 63 (in the direction indicated by arrow Ec) as Martens hardness C. Calculate the difference between Martens hardness A and Martens hardness C, and that between Martens hardness B and Martens hardness C, and define, the greater of Martens hardness A or Martens hardness B in absolute value of the difference with Martens hardness C, is determined as the Martens hardness of the edge layer 6. That is, when the absolute value of the difference between Martens hardness A and Martens hardness C is greater than the difference between Martens hardness B and Martens hardness C, Martens hardness A is defined as the Martens hardness of the edge layer 6. When the difference between Martens hardness B and Martens hardness C is greater than the difference between Martens hardness A and Martens hardness C, Martens hardness B is defined as the Martens hardness of the edge layer 6.

Table 2 shows the Martens hardness measured by this method.

[Evaluation Items]

(Occurrence of Filming)

Under a temperature of 32° C. and a humidity of 54%, a solid image extending entirely A4 size was output on 10,000 sheets consecutively. The solid image was used to input a greater amount of toner to the photoconductor. Then, the occurrence of filming was evaluated in the following two levels.

None: The trace of filming on the output images is not observed with eyes, and image failure is not recognized.

Occurred: The trace of filming on the output images is observed with eyes, and the image is degraded.

TABLE 2

| | Blade | Elastic power (%) | | Martens hardness (N/mm²) | | | |
|---|---|---|---|---|---|---|---|
| | structure | Edge layer | Backup layer | Edge layer | Backup layer | Fatigue of blade | Filming |
| E1 | Double layer | 82 | 91 | 1.1 | 0.8 | None | None |
| E2 | Double layer | 79 | 85 | 2.0 | 0.7 | None | None |
| E3 | Double layer | 75 | 81 | 2.5 | 0.9 | None | None |
| E4 | Double layer | 72 | 89 | 3.5 | 0.7 | None | None |
| E5 | Double layer | 69 | 92 | 4.1 | 0.7 | None | None |
| E6 | Double layer | 67 | 85 | 4.2 | 0.8 | None | None |
| E7 | Double layer | 65 | 87 | 4.7 | 0.8 | None | None |
| E8 | Double layer | 62 | 82 | 5.0 | 0.9 | None | None |
| E9 | Double layer | 58 | 92 | 5.4 | 0.7 | None | None |
| E10 | Double layer | 52 | 85 | 5.8 | 0.7 | None | None |
| E11 | Double layer | 48 | 71 | 5.9 | 0.9 | None | None |
| E12 | Double layer | 46 | 80 | 6.1 | 0.9 | None | None |
| E13 | Double layer | 43 | 75 | 6.3 | 0.8 | None | None |
| E14 | Double layer | 40 | 70 | 6.5 | 0.9 | None | None |
| C1 | Single layer | 92 | | 0.7 | | None | Occurred |
| C2 | Single layer | 38 | | 6.0 | | Fatigued | None |
| C3 | Double layer | 92 | 68 | 0.7 | 2.9 | Fatigued | Occurred |
| C4 | Double layer | 87 | 59 | 0.8 | 4.0 | Fatigued | Occurred |
| C5 | Double layer | 82 | 52 | 0.9 | 5.5 | Fatigued | Occurred |
| C6 | Double layer | 78 | 48 | 2.1 | 6.3 | Fatigued | None |
| C7 | Double layer | 30 | 80 | 7.0 | 0.9 | None | None |
| C8 | Double layer | 35 | 85 | 6.8 | 0.9 | None | None |
| C9 | Double layer | 39 | 60 | 6.5 | 4.0 | Fatigued | None |
| C10 | Double layer | 30 | 50 | 7.0 | 5.3 | Fatigued | None |

(Configuration 1)

In the cleaning blade 5 according to Configuration 1, the Martens hardness of the edge layer 6 is 1.1 N/mm$^2$, and the Martens hardness of the backup layer 7 is 0.8 N/mm$^2$. The Martens hardness of the edge layer 6 is greater than 1.0 N/mm$^2$.

Configuration 1 was effective in inhibiting filming, meaning a phenomenon in which toner additives firmly adhere to the surface of the image bearer. Making the edge 61 of the cleaning blade 5 relatively hard is advantageous in scraping off substances adhering to the surface of the contact object, thereby inhibiting inconveniences, such as filing, caused by the substances firmly adhering to the surface of the contact object.

The edge layer 6 having a Martens hardness of equal to or greater than 1.0 N/mm$^2$ is effective in inhibiting filming as follows.

Figure 11A:
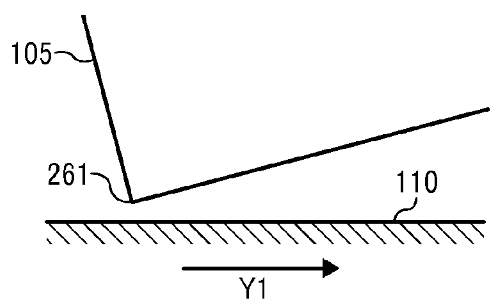
FIGS. 11A, 11B, and 11C are illustrations of wear of the single-layer cleaning blade.
Figure 11B:
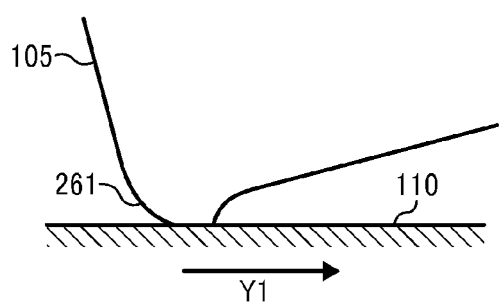
Figure 11C:
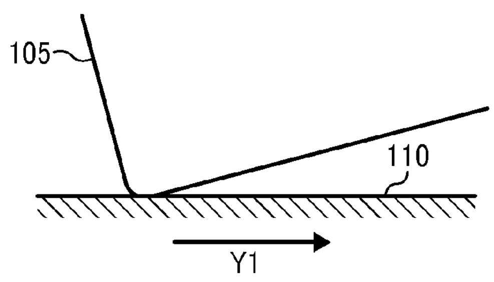

FIGS. 11A, 11B, and 11C are illustrations of wear of the edge 261 of the cleaning blade 105.

If the Martens hardness of the edge 261 is smaller than 1.0 N/mm$^2$, the following inconvenience may arise when the edge 261 of the cleaning blade 105 abuts or contacts the surface of the contact object 110 that moves in the direction indicated by arrow Y1, as illustrated in FIG. 11A.

If the Martens hardness of the edge 261 is smaller than 1.0 N/mm$^2$, deformation of the edge 261 caused by the load increases. Then, the area of contact between the edge 261 and the contact object 110 and the width of the nip therebetween increase.

Additionally, since the edge 261 is soft, as illustrated in FIG. 11B, the amount by which the edge 261 is drawn in by the movement of the contact object 110 increases, and the edge 261 deforms greatly. When the nip between the contact object 110 and the edge 261 is large in width and the amount of deformation of the edge 261 is large, the contact pressure of the edge 261 is dispersed. Then, the edge 261 fails to remove substances adhering to the contact object 110. Additionally, when the amount of deformation of the edge 261 is large, a load is applied to the edge 261, causing abrasion and chipping as illustrated in FIG. 11C.

In the cleaning blade 5 according to Configuration 1, the Martens hardness of the edge layer 6 is equal to or greater than 1.0 N/mm$^2$. This structure reduces the amount of deformation of the edge 61 caused by the load applied to the edge 61, and the area of contact between the edge 61 and the contact object 110 and the width of the nip therebetween are made smaller. Additionally, since the edge 61 is harder, the amount by which the edge 61 is drawn in by the movement of the photoconductor (contact object) is smaller, and the edge 61 less easily deforms. When the width of the nip and the amount of deformation of the edge 61 are smaller, the contact of the edge 261 with the contact object is stable. Then, the edge 61 reliably removes substances adhering to the contact object. Additionally, since the deformation of the edge 61 is smaller, the load on the edge 61 is smaller. Accordingly, abrasion and chipping of the ridgeline at the end of the cleaning blade 5 are inhibited.

It is to be noted that, if the Martens hardness of the edge layer 6 is equal to or greater than 10 N/mm$^2$, the following inconvenience may arise.

Generally, regarding urethane rubber used for cleaning blades, the elastic power tends to decrease as the hardness increases. Accordingly, as the cleaning blade becomes harder, the elastic power thereof decreases. In the case of the cleaning blade reduced in elastic power, the edge of the cleaning blade plastically deforms (micro deformation) due to the sliding with the contact object, and the edge wears. Therefore, the Martens hardness of the edge layer 6 is preferably smaller than 10 N/mm$^2$.

In the cleaning blade 5 according to Configuration 1, the edge layer 6 is higher in Martens hardness than the backup layer 7.

When urethane rubber, which is widely used in cleaning blades, is increased in hardness to enhance the capability to remove the substances adhering to the contact object, elasticity thereof decreases. Then, the capability to follow the surface unevenness of the contact object decreases. When the capability to follow decreases, the amount of toner escaping the cleaning blade increases, and the cleaning capability is degraded.

When the edge layer 6 is higher in Martens hardness than the backup layer 7 as in Configuration 1, the capability of the edge layer 6 can be separated from that of the backup layer 7. In other words, even in a case where the edge layer 6 is higher in hardness to enhance the capability to clean the surface of the contact object, the capability of the entire cleaning blade to follow the surface shape of the contact object is maintained by setting the hardness of the backup layer 7 to a relatively low value to secure the elasticity.

(Configurations 2 Through 14)

Configurations 2 through 14 was effective in inhibiting filming of toner additives on the surface of the image bearer since the Martens hardness of the edge layer 6 was equal to or greater than 1.0 N/mm$^2$ similar to Configuration 1.

Additionally, since the edge layer 6 was higher in Martens hardness than the backup layer 7, even in the case where the edge layer 6 was increased in hardness to enhance the cleaning capability, the capability of the entire cleaning blade to follow the surface shape of the contact object was maintained.

The reason of such an evaluation result is similar to that of Configuration 1, and thus the description is omitted.

Comparative Example 1

In the Comparative example 1, the single-layer cleaning blade 105 was used, and the Martens hardness of the edge 261 is lower than 1.0 N/mm$^2$.

Since the Martens hardness of the edge 261 was lower than 1.0 N/mm$^2$, the nip between the contact object 110 and the edge 261 was large in width, and the contact pressure of the edge 261 was dispersed. Accordingly, the edge 261 failed to remove substances adhering to the contact object 110. Additionally, since the amount of deformation of the edge 261 was large, the load was applied to the edge, causing abrasion and chipping. The dispersion of contact pressure and the abrasion and chipping of the edge 261 caused filming.

Comparative Example 2

In the Comparative example 2, the single-layer cleaning blade 105 was used, and the Martens hardness of the edge 261 was 6.0 N/mm$^2$.

Generally, urethane rubber used for cleaning blades tends to decrease in elastic power as the hardness thereof increases. Accordingly, if the cleaning blade is made harder to inhibit filming, the elastic power thereof decreases.

The cleaning blade 105 according to Comparative example 2 is single-layered and made of the material higher in hardness and lower in elastic power. Accordingly, the rate of plastic deformation relative to the elastic deformation is greater when the cleaning blade 105 is deformed with force. Accordingly, the cleaning blade 105 according to Comparative example 2 fatigued.

Comparative Examples 3 Through 5

The cleaning blade used in any of Configurations 3 through 5 is double-layered and includes the edge layer 6 and the backup layer 7. Differently from Configurations 1 through 14, the Martens hardness of the edge layer 6 is smaller than 1.0 N/mm$^2$.

Since the Martens hardness of the edge was lower than 1.0 N/mm$^2$, the nip between the contact object and the edge was large in width, and the contact pressure of the edge was dispersed. Accordingly, the edge failed to remove substances adhering to the contact object. Additionally, since the amount of deformation of the edge was large, the load was applied to the edge, causing abrasion and chipping. The dispersion of contact pressure and the abrasion and chipping of the edge caused filming.

Comparative Example 6

The cleaning blade used in Configuration 6 is double-layered and includes the edge layer 6 and the backup layer 7. Differently from Configurations 1 through 14, the backup layer 7 is higher in Martens hardness than the edge layer 6.

Configuration 6 was effective in inhibiting filming since the Martens hardness of the edge layer 6 was equal to or greater than 1.0 N/mm$^2$. However, since the backup layer 7 was higher in Martens hardness than the edge layer 6, the elasticity of the entire cleaning blade decreased. Accordingly, the capability to follow decreased, and the amount of toner escaping the cleaning blade increased, resulting in defective cleaning.

Comparative Examples 7 and 8

In the cleaning blade according to any of Comparative examples 7 and 8, the Martens hardness of the edge layer 6 is equal to or greater than 1.0 N/mm$^2$. Similar to Configurations 1 through 14, the edge layer 6 is higher in Martens hardness than the backup layer 7.

Since the Martens hardness of the edge layer 6 was equal to or greater than 1.0 N/mm$^2$, filming was inhibited.

Comparative Examples 9 and 10

In the cleaning blade according to Comparative example 9 or 10, the Martens hardness of the edge layer 6 is equal to or greater than 1.0 N/mm$^2$. Similar to Configurations 1 through 14, the edge layer 6 is higher in Martens hardness than the backup layer 7. Accordingly, filming was inhibited.

In the cleaning blade according to Comparative example 9 or 10, the elastic power of the backup layer 7 is smaller than 70%. Accordingly, the cleaning blade fatigued, and cleaning was defective.

Next, an electrophotographic printer is described below as an embodiment of an image forming apparatus incorporating the cleaning blade 5 illustrated in FIG. 1. A basic configuration of the image forming apparatus is described below.

Figure 5:
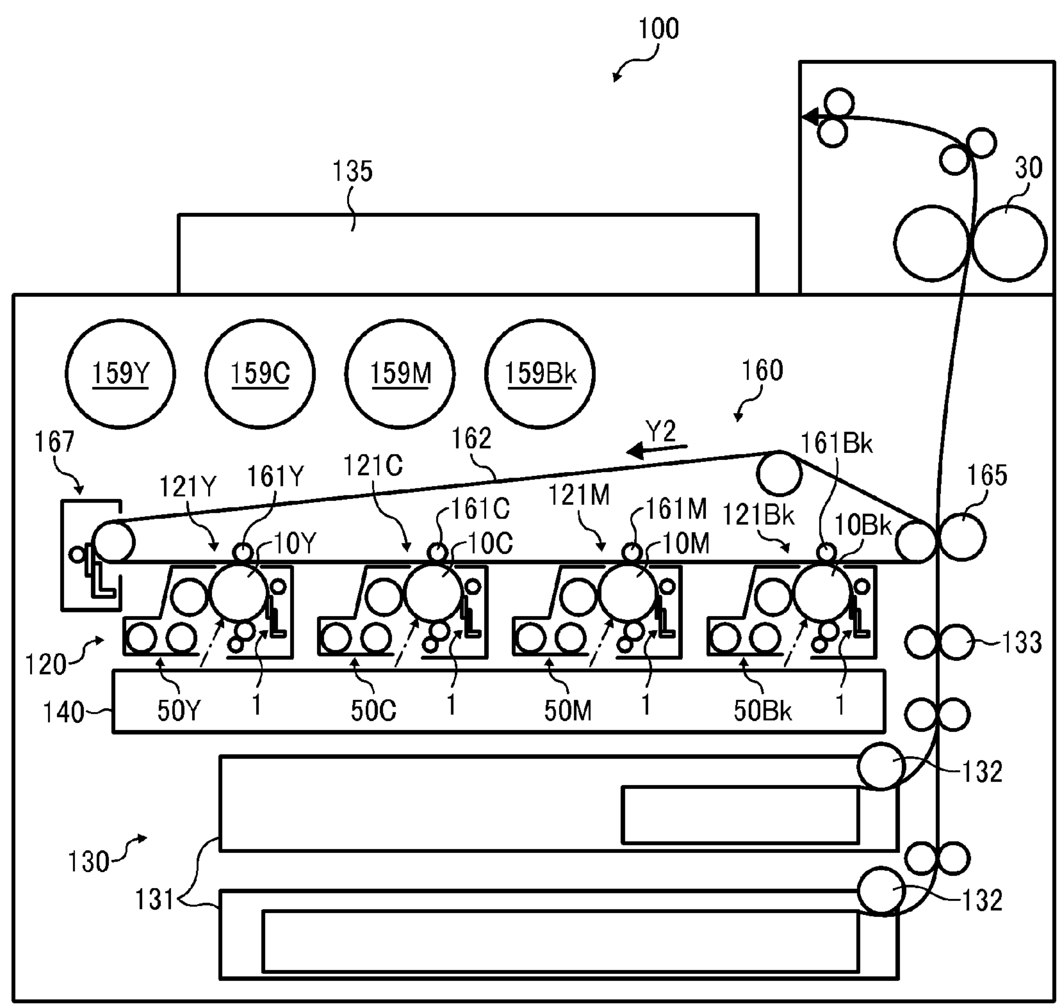
FIG. 5 is a schematic diagram of an image forming apparatus according to an embodiment.

FIG. 5 is a schematic diagram of an image forming apparatus 100 according to the present embodiment.

The image forming apparatus 100 is capable of forming multicolor images and includes an image forming unit 120, an intermediate transfer unit 160, and a sheet feeder 130. It is to be noted that reference characters Y, C, M, and Bk show yellow, magenta, cyan, and black, respectively, and may be omitted in the description below when color discrimination is not necessary.

The image forming unit 120 includes process cartridges 121Y, 121C, 121M, and 121Bk for yellow, cyan, magenta, and black, respectively. The process cartridges 121Y, 121C, 121M, and 121Bk are arranged in line in a substantially horizontal direction. The process cartridges 121 are removably insertable into the image forming apparatus 100.

The intermediate transfer unit 160 includes an intermediate transfer belt 162, which is an endless belt, primary transfer rollers 161Y, 161C, 161M, and 161Bk, and a secondary transfer roller 165. The intermediate transfer belt 162 is entrained around multiple support rollers. The intermediate transfer belt 162 is positioned above the process cartridges 121 and along the direction in which drum-shaped photoconductors 10Y, 10C, 10M, and 10Bk (i.e., latent image bearers) of the process cartridges 121Y, 121C, 121M, and 121Bk rotate. The intermediate transfer belt 162 rotates in synchronization with the rotation of the photoconductors 10. The primary transfer rollers 161 are positioned along the inner circumferential side of the intermediate transfer belt 162. With the primary transfer rollers 161, the outer circumferential face of the intermediate transfer belt 162 is lightly pressed against the surfaces of the photoconductors 10.

The process cartridges 121 are similar in configuration and operation to form toner images on the respective photoconductors 10 and transfer the toner images onto the intermediate transfer belt 162. A pivot mechanism is provided for the three primary transfer rollers 161Y, 161C, and 161M corresponding to the process cartridges 121Y, 121C, and 121 M for colors other than black to move these primary transfer rollers 161 vertically in FIG. 5. The pivot mechanism disengages the intermediate transfer belt 162 from the photoconductors 10Y, 10C, and 10M when multicolor image formation is not performed. Additionally, a belt cleaning device 167 is disposed downstream from the secondary transfer roller 165 and upstream from the process cartridge 121Y in the direction indicated by arrow Y2 shown in FIG. 5, in which the intermediate transfer belt 162 rotates.

Above the intermediate transfer unit 160, toner cartridges 159 for the respective process cartridges 121 are arranged substantially horizontally. Below the process cartridges 121, an exposure device 140 is provided. The exposure device 140 directs laser beams to the charged surfaces of the photoconductors 10 to form electrostatic latent images thereon.

The sheet feeder 130 is provided below the exposure device 140. The sheet feeder 130 includes sheet trays 131 for containing sheets of recording media and sheet feeding rollers 132. The sheet feeder 130 feeds sheets to a secondary transfer nip formed between the intermediate transfer belt 162 and the secondary transfer roller 165 via a pair of registration rollers 133 at a predetermined timing.

A fixing device 30 is provided downstream from the secondary transfer nip in the direction in which sheets are transported (hereinafter "sheet conveyance direction"). Further, an ejection roller and an output tray 135 to receive sheets discharged are disposed downstream from the fixing device 30 in the sheet conveyance direction.

FIG. 6 schematically illustrates a configuration of the process cartridge 121 included in the image forming apparatus 100.

The process cartridges 121 have a similar configuration, and therefore the subscripts Y, C, M, and Bk for color discrimination are omitted in the description of the configuration and operation of the process cartridges 121, given below.

In addition to the drum-shaped photoconductor 10, the process cartridge 121 includes a cleaning device 1, a charging device 40, and a developing device 50 disposed around the photoconductor 10.

The cleaning device 1 includes the elastic cleaning blade 5, which is shaped like a strip and long in the axial direction of the photoconductor 10. The cleaning device 1 presses the edge 61 (ridgeline), which is perpendicular to the rotation of the photoconductor 10, to the surface of the photoconductor 10. With the edge 61 pressed against the surface of the photoconductor 10, the cleaning device 1 removes substances, such as residual toner, from the surface of the photoconductor 10. A discharge screw 43 of the cleaning device 1 discharges the removed toner outside cleaning device 1.

The charging device 40 includes a charging roller 41 opposing the photoconductor 10 and a roller cleaner 42 that rotates while being contact with the charging roller 41.

The developing device 50 is designed to supply toner to the surface of the photoconductor 10 to develop the latent image formed thereon into a visible image and includes a developing roller 51 serving as a developer bearer to bear developer including carrier and toner. The developing device 50 includes the developing roller 51, an agitation screw 52, and a supply screw 53. The agitation screw 52 stirs and transports developer contained in a developer container, and the supply screw 53 transports the developer while supplying the agitated developer to the developing roller 51.

The four process cartridges 121 having the above-described configuration can be independently removed from the apparatus body, installed therein, and replaced by service persons or users. When the process cartridge 121 is removed from the image forming apparatus 100, the photoconductor 10, the charging device 40, the developing device 50, and the cleaning device 1 can be replaced independently. It is to be noted that the process cartridge 121 may further includes a waste-toner tank to collect the toner removed by the cleaning device 1. In this case, it is convenient when the waste-toner tank is independently removable, installable, and replaceable.

Next, operation of the image forming apparatus 100 is described below.

The image forming apparatus 100 receives print commands via a control panel or from external devices such as computers. Initially, the photoconductor 10 starts rotating in the direction indicated by arrow A shown in FIG. 6, and the charging rollers 41 charge the surfaces of the photoconductors 10 uniformly to a predetermined polarity. The exposure device 140 directs light, such as laser beams, for respective colors to the charged photoconductors 10. The laser beams are optically modulated according to multicolor image data input to the image forming apparatus 100. Thus, electrostatic latent images for respective colors are formed on the photoconductors 10. The developing rollers 51 of developing devices 50 supply respective color toners to the electrostatic latent images, thereby developing the electrostatic latent images into toner images.

Subsequently, the transfer voltage opposite in polarity to the toner image is given to the primary transfer roller 161, thereby forming a primary transfer electrical field between the photoconductor 10 and the primary transfer roller 161 via the intermediate transfer belt 162. Simultaneously, the primary transfer nip is formed by the primary transfer roller 161 lightly pressed against the intermediate transfer belt 162. With these actions, the respective toner images on the photoconductors 10 are primarily transferred onto the intermediate transfer belt 162 efficiently. The toner images are superimposed one on another on the intermediate transfer belt 162, forming a multilayer toner image (i.e., multicolor toner image).

Toward the multilayer toner image on the intermediate transfer belt 162, a sheet is timely transported from the sheet tray 131 via the sheet feeding roller 132 and the pair of registration rollers 133. A transfer voltage opposite in polarity to toner images is given to the secondary transfer roller 165, thereby forming a secondary-transfer electrical field between the intermediate transfer belt 162 and the secondary transfer roller 165 via the sheet. The toner image is transferred onto the sheet by the secondary-transfer electrical field. The sheet is then transported to the fixing device 30, in which the toner image is fixed on the sheet with heat and pressure. The sheet bearing the fixed toner image is discharged by the ejection roller to the output tray 135. After the primary-image transfer, toner remaining on the respective photoconductors 10 is removed by the cleaning blades 5 of the cleaning devices 1.

It is to be noted that another embodiment employs a contact-type charging roller to apply, to the image bearer, superimposed voltage including direct current (DC) voltage and alternating current (AC) voltage. In this configuration, the charging current is greater, and the potential of the charged image bearer becomes more reliable, thus enhancing image quality and extending the operational life.

When the AC voltage is applied to a charger, the image bearer vibrates, and the edge 61 of the cleaning blade 5 vibrates significantly. The vibration causes noise and wear or chipping of the cleaning blade 5 and aggravates wear of the photoconductor 10. In the cleaning blade 5 according to the present embodiment, the edge layer 6 is lower in elastic power than the backup layer 7. Accordingly, the present embodiment suppresses noise, wear, and chipping of the cleaning blade 5 as well as aggravated wear of the photoconductor 10 caused by vibration due to AC voltage applied to the charger.

Next, descriptions are given below of another configuration of the process cartridge to which the cleaning blade 5 according to the present embodiment is applied.

Figure 7:
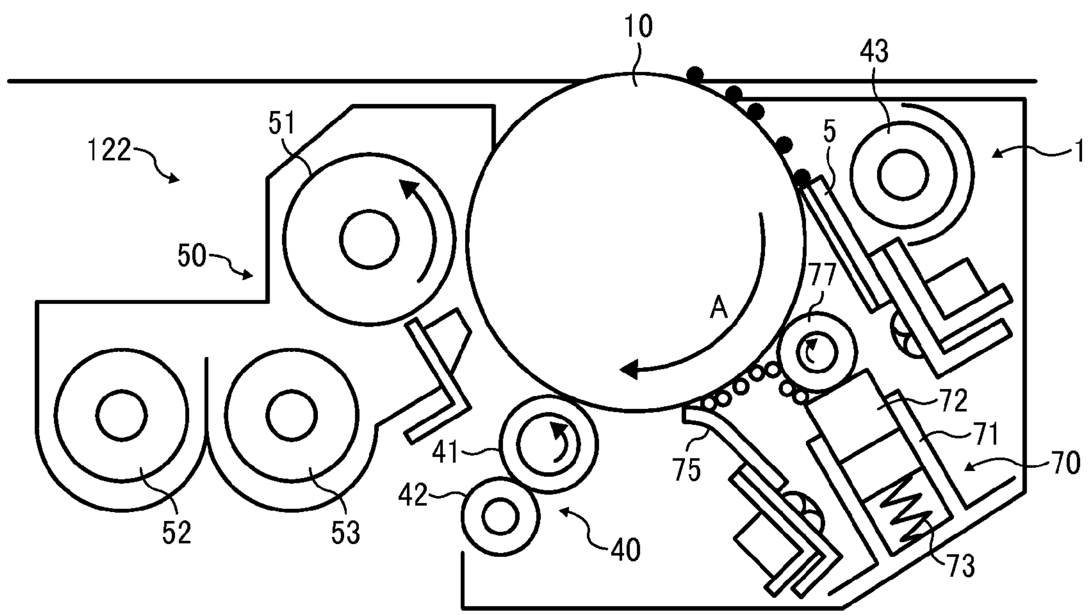
FIG. 7 is a schematic cross-sectional view illustrating another process cartridge installable in the image forming apparatus illustrated in FIG. 5.

FIG. 7 is a schematic cross-sectional view illustrating a process cartridge 122 installable in the image forming apparatus 100 according to the present embodiment.

The process cartridge 122 includes a lubrication device 70 to supply protectant, as lubricant, to the surface of the photoconductor 10. The charging roller 41 used in the process cartridge 122 is either in contact or contactless with the photoconductor 10 to charge the photoconductor 10, and AC voltage is applied to the charging roller 41. The lubrication device 70 is disposed downstream from the cleaning device 1 in the direction indicated by arrow A, in which the photoconductor 10 rotates. With this arrangement, the protectant is reliably applied to the photoconductor 10.

In the lubrication device 70, a bar-shaped solid protectant 72 is held by a cylindrical support 71. A compression spring 73 disposed inside the support 71 biases the solid protectant 72 to the photoconductor 10. A rotatable foamed urethane roller 77 is disposed between the solid protectant 72 and the photoconductor 10. By rotating, the foamed urethane roller 77 scrapes off protectant from the solid protectant 72 and applies the protectant to the surface of the photoconductor 10. Downstream from the foamed urethane roller 77 in the direction indicated by arrow A, an application blade 75 made of or includes polyurethane or the like is disposed to level the protectant in a thin layer on the surface of the photoconductor 10.

The foamed urethane roller 77 rotates in a direction counter to rotation of the photoconductor 10 indicated by arrow A. The application blade 75 contacts the photoconductor 10 in a direction trailing to rotation of the photoconductor 10. With this arrangement, the protectant can be effectively made into a thin layer without being scraping off the photoconductor 10.

The protectant used here includes fatty acid metallic salt and inorganic lubricant. In such protectant, since the fatty acid metallic salt is broken by the charging current, damage of the surface of the photoconductor 10 is inhibited. Simultaneously, with the inorganic lubricant that is not broken by the charging current, lubricating capability of the protectant is maintained in a better condition compared with applying the fatty acid metallic salt only. Accordingly, more preferable cleaning of the photoconductor 10 is attained.

Examples usable as fatty acid metallic salt include, but not limited to, barium stearate, lead stearate, iron stearate, nickel stearate, cobalt stearate, copper stearate, strontium stearate, calcium stearate, cadmium stearate, magnesium stearate, zinc stearate, zinc oleate, magnesium oleate, iron oleate, cobalt oleate, copper oleate, lead oleate, manganese oleate, zinc palmitate, cobalt palmitate, lead palmitate, magnesium palmitate, aluminum palmitate, calcium palmitate, lead caprylate, lead caprate, linolenic acid, zinc linolenate, cobalt linolenate, calcium linolenate, zinc ricinoleate, and cadmium ricinoleate; and a mixture thereof. Two or more of these materials can be used in combination. Among these materials, zinc stearate is particularly preferable for its suitability for film formation on the photoconductor 10.

Inorganic lubricant is an inorganic compound that cleaves by itself and lubricates a target or causes slip therein. Specific examples include, but not limited to, talc, mica, boron nitride, molybdenum disulfide, tungsten disulfide, kaolin, smectite, hydrotalcite compounds, calcium fluoride, graphite, planar alumina, sericite, and synthetic mica. Among these materials, in boron nitride, hexagonal net faces in which atoms are firmly combined together overlays with each other with relatively wide spaces secured between layers, and only Van der Waals force, which is relatively weak, acts between the layers. Thus, boron nitride easily cleaves and lubricates the target, and thus boron nitride is particularly preferable. It is to be noted that, to give hydrophobicity thereto, inorganic lubricant can be subjected to surface treatment as required.

Experiment 3

Descriptions are given below of Experiment 3 executed to evaluate the double-layer cleaning blade 5 (illustrated in FIG. 1) including the edge layer 6 of elastic power smaller than 40%. In Experiment 3, cleaning capability under cool and dry conditions were evaluated with the lubricated photoconductor 10 and the photoconductor 10 not lubricated while the elastic powers of the edge layer 6 and the backup layer 7 were changed.

(Defective Cleaning Under Cool and Dry Conditions)

A Ricoh image forming apparatus, MP C3503, was used as a test machine, and the cleaning blade 5 of the process cartridge 122 illustrated in FIG. 7 was replaced with those according to Configurations 15 through 18 and Comparative examples 11 through 14. The evaluations were made using both of the photoconductor 10 lubricated and the photoconductor 10 not lubricated.

Under cool and dry conditions, defective cleaning is likely to occur. After the test machine was left unused for 24 houses under low temperature (10° C.) and low humidity (15%) conditions, images were output on 80,000 sheets consecutively under the temperature of 10° C. and the humidity of 15%. To input a greater amount of toner to the photoconductor (image bearer), a solid image extending entirely A4 size was input. The output sheets were checked for a trace of defective cleaning with eyes and evaluated as follows.

Not observed: Cleaning capability is good. After output of 80,000 sheets, the trace of defective cleaning is not observed on the sheets, and practically there are no problems.

Observed: The trace of defective cleaning is visible. After output of 80,000 sheets, the trace of defective cleaning was observed on the sheets, and practically the outputs images were deemed substandard.

Table 3 below shows evaluation results of Configurations 15 through 18 (E15 through E18 in Table 3) and the Comparative examples (C11 through C14 in Table 3).

TABLE 3

| | Blade structure | Elastic power (%) Edge layer | Backup layer | Lubrication | Cleaning capability under cool and dry conditions |
|---|---|---|---|---|---|
| E15 | Double layer | 30 | 71 | Lubricated | Good |
| E16 | Double layer | 32 | 90 | Lubricated | Good |
| E17 | Double layer | 35 | 82 | Lubricated | Good |
| E18 | Double layer | 38 | 85 | Lubricated | Good |
| C11 | Double layer | 30 | 71 | Not lubricated | Defective |
| C12 | Double layer | 32 | 90 | Not lubricated | Defective |
| C13 | Double layer | 35 | 82 | Not lubricated | Defective |
| C14 | Double layer | 38 | 85 | Not lubricated | Defective |

(Configuration 15)

In Configuration 15 (E15 in Table 3), the double-layer cleaning blade 5 including the edge layer 6 and the backup layer 7 was used. In the cleaning blade 5 according to Configuration 15, the backup layer 7 is higher in elastic power than the edge layer 6, and the elastic power of the edge layer 6 is equal to or greater than 30% and smaller than 40%.

When the elastic power of the edge layer 6 is smaller than 40%, the edge 61 of the cleaning blade 5 plastically deforms (micro deformation) due to the sliding with the photoconductor 10. The plastic deformation increases the amount of toner escaping the cleaning blade 5, and the edge 61 wears as the amount of escaping toner increases. Accordingly, cleaning becomes defective.

In Configuration 15, lubricant was applied to the surface of the photoconductor 10, thereby reducing the friction between the cleaning blade 5 and the photoconductor 10. Reducing the friction is effective in reducing the load applied to the edge 61 of the cleaning blade 5, and wear of the edge 61 is inhibited. Accordingly, defective cleaning under cool and dry was inhibited.

(Configurations 16 Through 18)

In the cleaning blades 5 according to any of Configurations 16 through 18, the elastic powers of the edge layer 6 and the backup layer 7 are different from those of Configuration 15 as shown in Table 3. Similar to Configuration 15, the elastic power of the edge layer 6 is equal to or greater than 30% and smaller than 40%, and lubricant was applied to the surface of the photoconductor 10, thereby inhibiting degradation of cleaning capability. The reason of such an evaluation result is similar to that of Configuration 15, and thus the description is omitted.

Comparative Example 11

In the cleaning blade used in Comparative example 11, the backup layer 7 is higher in elastic power than the edge layer 6 similar to Configuration 15. However, the photoconductor 10 was not lubricated. When the elastic power of the edge layer 6 is smaller than 40% and the photoconductor 10 is not lubricated, the friction between the photoconductor 10 and the cleaning blade 5 increases, and the edge 61 of the cleaning blade 5 plastically deforms (micro deformation) due to the sliding with the photoconductor 10. The plastic deformation increases the amount of toner escaping the cleaning blade 5, and the edge 61 wears as the amount of escaping toner increases. Accordingly, cleaning under cool and dry conditions was defective due to the wear of the edge 61 of the cleaning blade 5.

Comparative Examples 12 and 13

Similar to comparative example 11, the elastic power of the edge layer 6 was smaller than 40%, and lubricant was not applied to the surface of the photoconductor 1. Accordingly, cleaning was defective due to the wear of the edge 61 of the cleaning blade 5. The reason of such evaluation is similar to that of Comparative example 11, and thus the description is omitted.

From the evaluation results shown in Table 3, lubricating the contact object, namely, the photoconductor 10, is preferable. With the lubricant applied to the photoconductor 10, the friction between the cleaning blade 5 and the photoconductor 10 is reduced, and the load applied to the edge 61 of the cleaning blade 5 is reduced, thereby inhibiting wear of the edge 61 of the cleaning blade 5. Accordingly, defective cleaning under cool and dry conditions is inhibited.

When the photoconductor 10 is lubricated, it is preferable that the edge layer 6 of the cleaning blade 5 has an elastic power of 30% or greater. With this structure, even in configurations where the elastic power of the edge layer 6 is smaller than 40%, defective cleaning caused by plastic deformation of the edge 61 is inhibited.

It is to be noted that, in Experiment 3, urethane rubber having an elastic power of 30% or greater was used to maintain elasticity of the material. When the elastic power of the edge layer 6 is smaller than 30%, it is difficult to maintain the elasticity of the material.

Next, descriptions are given below of yet another configuration of the process cartridge to which the cleaning blade 5 according to the present embodiment is applied.

Figure 8:
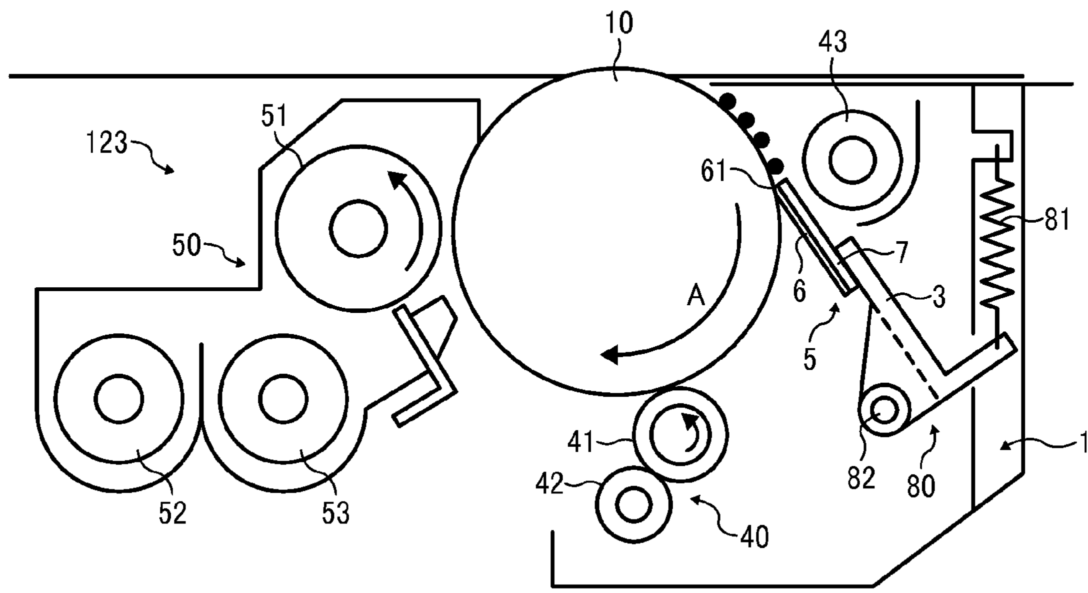
FIG. 8 is a schematic cross-sectional view illustrating another process cartridge installable in the image forming apparatus illustrated in FIG. 5.

FIG. 8 is a schematic cross-sectional view illustrating a process cartridge 123.

The process cartridge 123 employs a spring compression to press the cleaning blade to the surface of the photoconductor 10. Specifically, the process cartridge 123 includes a pressing device 80 using a spring 81. The spring compression used in the process cartridge 123 is constant contact-pressure type and keeps the contact pressure of the cleaning blade 5 to the photoconductor 10 constant, regardless with elapse of time.

The pressing device 80 includes a rotation support 82, serving as a fulcrum, provided to the support 3 to support the cleaning blade 5. The pressing device 80 causes the support 3 to rotate or pivot around the rotation support 82 by the tension of the spring 81, thereby pressing the edge 61 of the cleaning blade 5 to the photoconductor 10. It is to be noted that, in the structure illustrated in FIG. 8, the pressing force of the edge 61 is set at 20.0 g/cm.

The charging roller 41 used in the process cartridge 123 is in contact with the photoconductor 10 to charge the photoconductor 10, and AC voltage is applied to the charging roller 41. The charging roller 41 uniformly charges the surface of the photoconductor 10 by rotating while being in contact with the photoconductor 10.

Experiment 4

Descriptions are given below of Experiment 4 to evaluate the cleaning blade 5 including the backup layer 7 of elastic power smaller than 70%. In Experiment 4, effects of wear of the cleaning blade 5 on the cleaning capability were evaluated while the elastic powers of the edge layer 6 and the backup layer 7 as well as the pressing type to press the cleaning blade 5 were changed.

(Cleaning Blade Pressing Type)

Using the process cartridge 123 illustrated in FIG. 8, the constant contact-pressure type and a constant biting-amount type were evaluated as the pressing type of the cleaning blade 5. In the constant contact-pressure type, the contact pressure of the cleaning blade 5 to the photoconductor 10 is kept constant by the spring 81 even with elapse of time. In the constant biting-amount type, the support 3 illustrated in FIG. 8 was secured to keep the amount by which the edge 61 of the cleaning blade 5 bites in the photoconductor 10 (hereinafter "biting amount of the cleaning blade 5") by 0.8 mm to 1.1 mm, thereby keeping the biting amount of the cleaning blade 5 substantially constant.

(Fatigue of Blade)

In experiment 4, the Ricoh image forming apparatus, MP C3503, was used, and the cleaning blade 5 of the process cartridge 123 illustrated in FIG. 8 was replaced with those according to Configurations 19 through 22 and Comparative examples 15 and 16.

Using the test machine, the blade edge contact pressure was measured before and after the cleaning blade was kept in contact with the photoconductor 10 for seven days (168 hours) under a temperature of 23° C. and a humidity of 50% (ordinary room conditions). The cleaning blade was kept in contact with the photoconductor 10, and changes in contact pressure were evaluated while the cleaning blade was kept under the pressure. The cleaning blade was set to contacts the photoconductor 10 with a contact pressure of 20 g/cm.

Effects of fatigue of the cleaning blade on the cleaning capability were evaluated as follows under a condition of high charging current.

Not affected: Reduction in line pressure is smaller than 4.0 g/cm (20% of line pressure setting). No effects on the cleaning capability.

Affected: Reduction in line pressure is equal to or greater than 4.0 g/cm (20% of line pressure setting). Cleaning capability affected.

Evaluation results of configurations according to the present embodiment and the comparative examples are shown in Table 4 below.

TABLE 4

| | | Elastic power (%) | | | Fatigue of blade | |
|---|---|---|---|---|---|---|
| | Blade structure | Edge layer | Backup layer | Pressing type | Effects on cleaning | Line pressure change (g/cm) |
| E19 | Double layer | 59 | 69 | Constant contact pressure | Not affected | 0.5 |
| E20 | Double layer | 50 | 61 | Constant contact pressure | Not affected | 0.4 |
| E21 | Double layer | 46 | 55 | Constant contact pressure | Not affected | 0.5 |
| E22 | Double layer | 41 | 50 | Constant contact pressure | Not affected | 0.7 |
| C15 | Double layer | 51 | 66 | Constant biting amount | Affected | 4.8 |
| C16 | Double layer | 42 | 53 | Constant biting amount | Affected | 5.3 |

In Table 4, E19 through E22 represent Configurations 19 through 22, and C15 and C16 represent Comparative examples 15 and 16.

(Configuration 19)

In Configuration 19, the double-layer cleaning blade 5 including the edge layer 6 and the backup layer 7 illustrated in FIG. 1 was used. In the cleaning blade 5 according to Configuration 19, the backup layer 7 is higher in elastic power than the edge layer 6, and the elastic power of the backup layer 7 is equal to or greater than 50% and smaller than 70%.

As the elastic power of the backup layer 7 decreases, the cleaning blade 5 is more likely to deform plastically due to the bending stress applied to the cleaning blade 5, and the cleaning blade 5 is more likely to fatigue. In the constant biting-amount type, when the cleaning blade 5 fatigues, the biting amount of the cleaning blade 5 is constant or substantially constant, and accordingly the line pressure decreases, making cleaning defective.

By contrast, the pressing type in Configuration 19 is not the constant biting-amount type but the constant contact-pressure type using the pressing device 80 illustrated in FIG. 8. In the constant contact-pressure type, the contact pressure is constant regardless of elapse of time, and the line pressure does not decrease even when the cleaning blade 5 fatigues. Thus, the defective cleaning due to decreases in line pressure is less likely to occur. In Configuration 19, the line pressure decreased by 0.4 g/cm, which is relatively small, and thus the cleaning capability was not significantly degraded.

(Configurations 20 Through 22)

In the cleaning blades 5 according to any of Configurations 20 through 22, the elastic powers of the edge layer 6 and the backup layer 7 are different from those of Configuration 1 as shown in Table 4. Other than that, the Configurations 20 through 22 are similar to Configuration 19.

In Configurations 20 through 22, the decrease in the line pressure was relatively small and from 0.4 g/cm to 0.6, and thus the cleaning capability was not significantly degraded. The reason of such an evaluation result is similar to that of Configuration 19, and thus the description is omitted.

Comparative Example 15

In the cleaning blade used in Comparative example 15, the backup layer 7 is higher in elastic power than the edge layer 6 similar to Configuration 19, and the elastic power of the backup layer 7 is equal to or greater than 50% and smaller than 70%. However, differently from Configurations 19 through 22, the biting amount of the cleaning blade 5 was kept constant.

As the elastic power of the backup layer 7 decreases, the cleaning blade 5 is more likely to deform plastically due to the bending stress applied to the cleaning blade 5, and the cleaning blade 5 is more likely to fatigue. In the constant biting-amount type, the line pressure decreases as the cleaning blade 5 fatigues with elapse of time, and cleaning becomes defective.

The line pressure was reduced by 4.1 g/cm after the cleaning blade was kept in contact with the photoconductor 10 for 168 hours. This reduction in line pressure is greater than the specified line pressure reduction of 4.0 g/cm (20% of line pressure setting), which causes defective cleaning in MP C3503. This reduction in line pressure reduction degraded the cleaning capability.

Comparative Example 16

In the cleaning blade according to Comparative example 16, the elastic power of the backup layer 7 is 50% or greater and smaller than 70% similar to Comparative example 15. However, in Comparative example 16, the biting amount of the cleaning blade 5 was kept constant, and thus the line pressure decreased with elapse of time, making cleaning defective. The reason of such evaluation is similar to that of Comparative example 16, and thus the description is omitted.

From the evaluation results shown in Table 4, it is preferable to keep the contact pressure of the cleaning blade 5 constant. When the pressure constant is kept constant, even when the cleaning blade 5 fatigues with elapse of time, the line pressure is kept constant or substantially constant. Accordingly, the defective cleaning due to decreases in line pressure is inhibited.

Additionally, when the constant contact-pressure type is employed, the elastic power of the backup layer 7 is preferably 50% or greater. With this structure, even when the elastic power of the backup layer 7 is smaller than 70%, decreases in line pressure are inhibited.

Next, the photoconductor 10 serving as the image bearer used in the embodiment is described below.

FIGS. 9A through 9D are cross-sectional views of layer structures applicable to the photoconductor 10 according to the present embodiment. In the layer structure illustrated in FIG. 9A, the photoconductor 10 includes a conductive support 91 and a photosensitive layer 92 overlying the conductive support 91, and inorganic particles are present at or adjacent to the surface of the photosensitive layer 92. The layer structure illustrated in FIG. 9B includes, from the bottom, the conductive support 91, the photosensitive layer 92, and a surface layer 93 including inorganic particles. The layer structure illustrated in FIG. 9C includes, from the bottom, the conductive support 91, the photosensitive layer 92, and the surface layer 93 including inorganic particles. The photosensitive layer 92 includes a charge generation layer 921 and a charge transport layer 922. The layer structure illustrated in FIG. 9D includes, from the bottom, the conductive support 91; a under layer 94; the photosensitive layer 92 including the charge generation layer 921 and the charge transport layer 922; and the surface layer 93 including inorganic particles.

That is, the photoconductor 10 according to the present embodiment includes, above the conductive support 91, at least the photosensitive layer 92, and the surface layer 93 may be provided above the photosensitive layer 92. In another embodiment, one or more layers are combined freely.

Figure 9A:
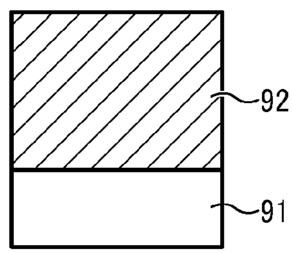
FIGS. 9A through 9D are cross-sectional views of layer structures applicable to a photoconductor according to an embodiment.

As illustrated in FIG. 9A, when the photosensitive layer 92 serves as the surface layer, the photosensitive layer 92 includes inorganic particles. When the photosensitive layer 92 includes the charge generation layer 921 and the charge transport layer 922 superimposed thereon, and the charge transport layer 922 is the surface layer, and the charge transport layer 922 includes inorganic particles.

Examples of inorganic particles added to the layer structure include metal powder such as copper, tin, aluminum, and indium; metal oxide such as silicon oxide, silica, tin oxide, zinc oxide, titanium oxide, indium oxide, antimony oxide, bismuth oxide, tin oxide in which antimony is doped, and indium oxide in which tin is doped; and inorganic material such as potassium titanate. Metal oxide is particularly preferable, and further silicon oxide, aluminum oxide, and titanium oxide are effective.

The inorganic particle preferably has an average primary particle diameter from 0.01 to 0.5 μm considering the characteristics of the surface layer 93 such as light transmission degree and abrasion resistivity. The abrasion resistivity and the degree of dispersion decrease when the average primary particle diameter is 0.01 μm or smaller. Additionally, when the average primary particle diameter is 0.5 μm or greater, inorganic particles in the dispersion liquid can sink more easily, and toner filming can occur.

As the amount of inorganic particles added increases, abrasion resistivity increases, which is desirable. An extremely large amount of inorganic particles, however, causes side effects such as increases in residual potentials and decreases in the degree at which writing light transmits a protective layer. Generally, the amount of addition to the total solid amount is preferably 30% by weight or less, and more preferably 20% by weight or less. The lower limit is generally 3% by weight.

The above-described inorganic particles can be treated with at least one surface treatment agent, which is preferable for facilitating the dispersion of inorganic particles.

Degradation in dispersion of inorganic particles can cause not only the rise of residual potentials but also degradation of transparency of coating, defective coating, and further degradation of abrasion resistivity. Accordingly, degradation in dispersion of inorganic particles can hinder the extension of operational life or image quality improvement. Next, the photosensitive layer 92 is described below.

Figure 9B:
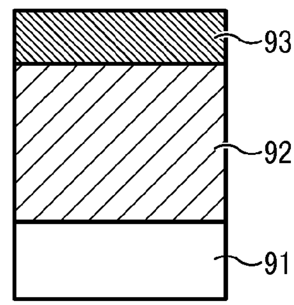
Figure 9C:
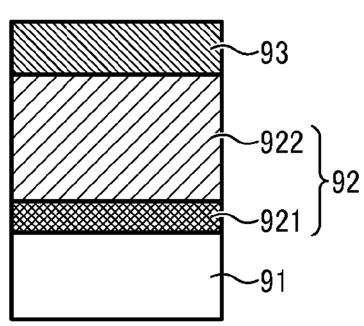
Figure 9D:
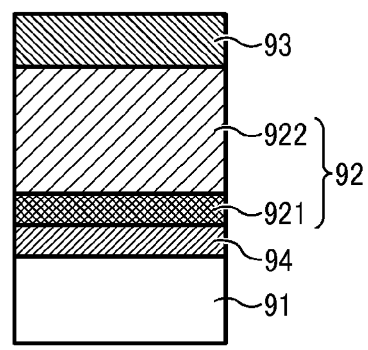

In the layer structure illustrated in FIGS. 9B, 9C, and 9D, the photoconductor 10 includes, above the photosensitive layer 92, the surface layer 93 including inorganic particles.

The surface layer 93 includes at least inorganic particles and binder resin. Examples of inorganic particle include powder of metal such as copper, tin, aluminum, and indium; metal oxide such as silicon oxide, silica, tin oxide, zinc oxide, titanium oxide, indium oxide, antimony oxide, bismuth oxide, tin oxide in which antimony is doped, indium oxide in which tin is doped; and inorganic materials such as potassium titanate. Metal oxide is particularly preferable, and further silicon oxide, aluminum oxide, and titanium oxide are effective.

The inorganic particle preferably has an average primary particle diameter from 0.01 to 0.5 μm considering the characteristics of the surface layer 93 such as light transmission degree and abrasion resistivity.

The abrasion resistivity and the degree of dispersion decrease when the average primary particle diameter is 0.01 μm or smaller. Additionally, when the average primary particle diameter is 0.5 μm or greater, inorganic particles in the dispersion liquid can sink more easily, and toner filming can occur. When the amount of inorganic particles added to the surface layer 93 is large, abrasion resistivity is high, which is desirable. An extremely large amount of inorganic particles, however, causes side effects such as increases in residual potentials and decreases in the degree at which writing light transmits the protective layer.

Generally, the amount of addition to the total solid amount is preferably 50% by weight or less, and more preferably 30% by weight or less. The lower limit is generally 3% by weight.

The above-described inorganic particles can be treated with at least one surface treatment agent, which is preferable for facilitating the dispersion of inorganic particles.

Degradation in dispersion of inorganic particles can cause not only the rise of residual potentials but also degradation of transparency of coating, defective coating, and further degradation of abrasion resistivity. Accordingly, degradation in dispersion of inorganic particles can hinder the extension of operational life or image quality improvement. Typical surface treatment agents can be used, but surface treatment agents capable of maintaining insulation of inorganic particles are preferable.

For example, titanate coupling agents, aluminum coupling agents, zircoaluminate coupling agents, higher fatty acids, mixtures of silane coupling agents and those, Al2O3, TiO2, ZrO2, silicone, aluminum stearate, and mixtures of two or more of them are preferable as the surface treatment agent to attain preferable dispersion of inorganic particles and inhibition of image blurring.

Although treatment with silane coupling agents increases image blurring effects, the effects may be inhibited by mixing the above-described surface treatment agents in the silane coupling agent. The amount of surface treatment agent is preferably from 3% by weight to 30% by weight and, more preferably, from 5% by weight to 20% by weight although it depends on the average primary particle diameter of inorganic particle. If the amount of surface treatment agent is smaller than this range, dispersion of inorganic particles is insufficient. If the amount is extremely large, the residual potential can rise significantly. The above-mentioned inorganic particles can be used alone or in combination. The above-mentioned inorganic particles can be dispersed using a dispersing device. The average particle diameter of the inorganic particles in the dispersion liquid is preferably 1 μm or smaller and, more preferably, 0.5 μm or smaller considering the transmittance of the surface layer 93.

As described above with reference to FIGS. 9A through 9C, including inorganic particles in the surface layer 93 (or the photosensitive layer 92 in FIG. 9A) is advantageous in inhibiting increases in friction force by the contact of the cleaning blade 5 with the photoconductor 10, and wear resistance of the surface of the photoconductor 10 is enhanced. As the wear resistance of the surface of the photoconductor 10 is enhanced, uneven wear (partial wear) is alleviated, thereby enhancing image quality, reliability, and durability of the electrophotographic image forming apparatus 100.

Additionally, the inorganic particles at the surface of the photoconductor 10 create micro surface unevenness, and it is possible that the edge 61 of the cleaning blade 5 vibrates, causing noise, wear or chipping of the cleaning blade 5, and aggravated wear of the photoconductor 10. In the present embodiment, since the cleaning blade 5 includes the edge layer 6 lower in elastic power than the backup layer 7, noise, wear and chipping of the cleaning blade 5, and aggravated wear of the photoconductor 10 are inhibited.

Next, descriptions are given below of toner preferably used in image forming apparatuses adopting feature of this specification.

Figure 10A:
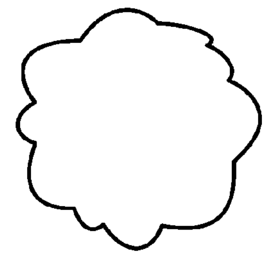
FIGS. 10A and 10B are illustrations of measurement of circularity of toner.
Figure 10B:
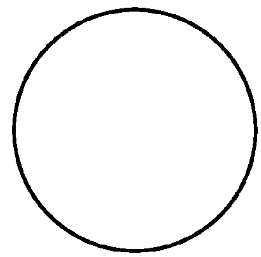

FIGS. 10A and 10B are illustrations of measurement of circularity of toner.

To improve image quality, it is preferable to use polymerization toner produced by suspension polymerization, emulsion polymerization, or dispersion polymerization, which is suitable for enhancing circularity and reducing particle diameter. In particular, it is preferred to use polymerization toner having a circularity of 0.97 or higher and a volume average particle diameter of 5.5 μm or smaller. High resolution can be attained by use of polymerization toner having a circularity of 0.97 or higher and a volume average particle diameter of 5.5 μm or smaller.

The circularity used herein is an average circularity measured by a flow-type particle image analyzer FPIA-2000 from SYSMEX CORPORATION. Specifically, put surfactant as a dispersant, preferably 0.1 ml to 0.5 ml of alkylbenzene sulfonate, in 100 ml to 150 ml of water from which impure solid materials are previously removed, and add 0.1 g to 0.5 g of the sample (toner) to the mixture. Then, disperse the mixture including toner with an ultrasonic disperser for 1 to 3 minutes to prepare a dispersion liquid having a concentration of from 3,000 to 10,000 pieces/μl, and measure the toner shape and distribution with the above-mentioned measurer. Based on the measurement results, obtain L2/L1 wherein L1 represents a peripheral length of a projected toner particle having an area S illustrated in FIG. 10A, and L2 represents a peripheral length of a perfect circle illustrated in FIG. 10B, identical in area with the projected toner particle. The average thereof is used as the circularity.

The volume average particle diameter of toner can be measured by a coulter counter method. Specifically, number distribution and volume distribution of toner, measured by Coulter Multisizer 2e from Beckman Coulter, are output, via an interface from Nikkaki Bios Co., Ltd., to a computer and analyzed.

More specifically, the volume average particle diameter of toner is obtained as follows. Prepare, as an electrolyte, a NaCl aqueous solution including a primary sodium chloride of 1%. Add 0.1 ml to 5 ml of surfactant, preferably alkylbenzene sulfonate, as dispersant, to 100 ml to 150 ml of the electrolyte. Add, as test sample, 2 to 20 mg of toner to the mixture and disperse the test sample by an ultrasonic disperser for 1 to 3 min. Put 100 ml to 200 ml of the electrolyte solution in a separate beaker, and put the above-described sample therein to attain a predetermined concentration. Then, using Coulter Multisizer 2e, measure the particle diameter of 50,000 toner particles with an aperture of 100 μm.

The number of channels used in the measurement is thirteen. The ranges of the channels are from 2.00 μm to less than 2.52 μm, from 2.52 μm to less than 3.17 μm, from 3.17 μm to less than 4.00 μm, from 4.00 μm to less than 5.04 μm, from 5.04 μm to less than 6.35 μm, from 6.35 μm to less than 8.00 μm, from 8.00 μm to less than 10.08 μm, from 10.08 μm to less than 12.70 μm, from 12.70 μm to less than 16.00 μm, from 16.00 μm to less than 20.20 μm, from 20.20 μm to less than 25.40 μm, from 25.40 μm to less than 32.00 μm, from 32.00 μm to less than 40.30 μm. The range to be measured is set from 2.00 μm to less than 40.30 μm. The target is toner particles of particle diameter greater than 2.00 μm and equal to or smaller than 32.0 μm.

Calculate the volume average particle diameter represented as $\Sigma XfV/\Sigma fV$, wherein X represents a representative diameter in each channel, V represents an equivalent volume of the representative diameter in each channel, and f represents the number of particles in each channel.

The configurations described above are just examples, and each of the following aspects of this specification attains a specific effect.

Aspect A: Aspect A concerns an elastic blade, such as the cleaning blade 5, which includes a contact edge (ridgeline at an end), such as the edge 61, to contact a surface of a contact object. The blade includes an edge layer that includes the contact edge, and at least one backup layer laminated on the edge layer. The elastic power of the layer(s) of the blade other than the edge layer is greater in elastic power than the edge layer.

According to Aspect A, as described above, regarding plastic deformation caused by force of bending or compression applied to the cleaning blade 5, the amount of plastic deformation of the backup layer 7 is smaller than the amount of plastic deformation of the edge layer 6. Accordingly, even in a configuration where the edge layer 6 has a greater hardness, fatigue of the entire cleaning blade 5 is suppressed.

Additionally, as the cleaning blade 5 slidingly contacts the photoconductor 10, the edge 61 of the cleaning blade 5 vibrates (micro vibration). If the frequency of this vibration coincides with the eigenfrequency of the cleaning blade 5, the vibration of the edge layer 6 including the edge 61 is about to grow. At that time, the backup layer 7 greater in elastic power than the edge layer 6 absorbs the vibration of the edge layer 6, thus serving as a vibration isolator. Accordingly, the backup layer 7 suppresses the occurrence of noise inherent to micro vibration of the edge 61 caused by the sliding with the contact object.

Further, since the edge layer 6 is lower in elastic power than the backup layer 7, the backup layer 7 absorbs the vibration caused by deformation of the edge layer 6, and the vibration frequency of the edge layer 6 less easily coincides with the eigenfrequency of the cleaning blade 5. Accordingly, the occurrence of vibration inherent in recovery from deformation of the edge 61 is inhibited.

Aspect B: In Aspect A, the elastic power of the layer or layers (the backup layer 7) other than the edge layer 6 is measured from the side of the blade end face (i.e., the end face 63) adjoining the opposing face via the contact edge (i.e., the edge 61) and is 70% or greater.

According to Aspect B, as described with reference to the results of the experiments, the fatigue of the blade is suppressed by plastic deformation of the backup layer.

If the elastic power of the backup layer is smaller than 70%, the backup layer plastically deforms due to bending stress given to the blade, and the entire blade fatigues. Then, the line pressure decreases. In the case of the cleaning blade 5, cleaning becomes defective.

Aspect C: In Aspect A or B, the elastic power of the layer or layers (the backup layer 7) other than the edge layer 6 measured from the blade end face (end face 63) is greater than either the elastic power of the edge layer measured from the blade end face or the elastic power of the edge layer measured from the opposing face. According to this aspect, as described above, even if the edge layer 6 is extremely thin compared with the backup layer 7, the elastic power of the edge layer 6 can be measured with a higher degree of accuracy. Accordingly, the elastic power of the edge layer 6 is properly compared with that of the backup layer 7.

Aspect D: In any of Aspects A through C, the elastic power of the edge layer 6 measured from either the opposing face (62) or the blade end face (end face 63) is 40% or greater.

As described with reference to the results of the experiments, this aspect is advantageous in inhibiting defective cleaning caused by plastic deformation of the contact edge of the blade. If the elastic power of the edge layer 6 is smaller than 40%, micro plastic deformation of the edge 61 occurs due to the sliding with the contact object. Then, a greater amount of substances (e.g., toner and additives) escape from the gap at the nip between the contact edge and the contact object. The escaped substances abrade the contact edge of the blade, and the cleaning capability is degraded.

Aspect E: In any of Aspects A through D, the contact object such as the photoconductor 10 is lubricated with lubricant such as the protectant supplied from the solid protectant 72.

As described with reference to the results of the experiments, this aspect reduces the friction between the blade and the contact object, and the load applied to the contact edge of the blade is reduced, thereby inhibiting wear of the contact edge. Accordingly, defective cleaning under cool and dry is inhibited.

Aspect F: In any of Aspects A through C, the contact object such as the photoconductor 10 is lubricated with lubricant such as the protectant supplied from the solid protectant 72, and the elastic power of the edge layer is 30% or greater.

As described with reference to the results of the experiments, with this aspect, even when the elastic power of the edge layer 6 is smaller than 40%, inconveniences caused by plastic deformation of the contact edge 61 is inhibited.

Aspect G: In any of Aspects A through F, a pressing device (80) presses the blade to the contact object with a contact pressure of the blade with the contact object kept constant or substantially constant.

According to this aspect, the contact pressure is kept constant regardless of elapse of time, and the line pressure does not decrease. Accordingly, the defective cleaning due to decreases in line pressure is inhibited.

Aspect H: In any of Aspects A through E, the pressing device (80) presses the blade to the contact object with a contact pressure of the blade with the contact object kept constant or substantially constant, and the elastic power of the layer(s) of the blade other than the edge layer is 50% or greater.

As described with reference to the results of the experiments, with this aspect, even when the elastic power of the backup layer is smaller than 70%, inconveniences caused by line pressure reduction is inhibited.

Aspect I: In Aspect A, the Martens hardness of the edge layer is equal to or greater than 1.0 $N/mm^2$.

As described with reference to the results of the experiments, this aspect is advantageous in inhibiting firm adhesion of toner additive to the image bearer (i.e., filming).

When the Martens hardness of the edge layer is lower than 1.0 $N/mm^2$, the nip between the contact object and the contact edge is large in width, and the contact pressure of the contact edge is dispersed. Accordingly, the edge failed to remove substances adhering to the contact object. Additionally, since the amount of deformation of the contact edge is large, the load applied to the contact edge is large, causing abrasion and chipping of the contact edge. The filming occurs due to the dispersion of contact pressure and the abrasion and chipping of the contact edge cause.

Aspect J: In Aspect I, the edge layer is greater in Martens hardness than the layer(s) of the blade other than the edge layer.

According to this aspect, as described with reference to the results of the experiments, the function of the edge layer is separated from the function of the backup layer. In other words, even in a case where the edge layer is higher in hardness to enhance the capability to clean the surface of the contact object, the capability of the entire cleaning blade to follow the surface shape of the contact object is maintained by setting the hardness of the backup layer to a relatively low value to secure the elasticity.

Aspect K: In Aspect I or J, the Martens hardness of the edge layer, measured from either the side of the opposing face or the side of the blade end face, is greater than the Martens hardness of the layer(s) of the blade other than the edge layer, measured from the blade end face.

According to this aspect, as described above, even if the edge layer 6 is extremely thin compared with the backup layer 7, the Martens hardness of the edge layer 6 can be measured with a higher degree of accuracy. Accordingly, the Martens hardness of the edge layer 6 is properly compared with that of the backup layer 7.

Aspect L: An image forming apparatus includes a charger, such as the charging device 40, to charge a surface of an image bearer, such as the photoconductor 10; an exposure device (140) to expose the surface of the charged image bearer to form an electrostatic latent image thereon; a developing device (50) to develop the latent image with toner into a visible image; a transfer device, such as the intermediate transfer unit 160 and the secondary transfer roller 165 to transfer the toner image onto a recording medium; a fixing device (30) to fix the toner image on the recording medium; and a cleaning device (1) to remove toner from the image bearer. The cleaning device includes the blade according to any one of Aspects A through K.

This aspect inhibits fatigue of the entire blade of the cleaning device as well as noise caused by vibration of the edge layer that contacts the photoconductor.

Aspect M: In Aspect L, the charger such as the charging device 40 applies AC voltage to the surface of the image bearer such as the photoconductor 10.

According to this aspect, the potential of the charged image bearer becomes more stable, thus enhancing image quality and extending the operational life.

Aspect N: In Aspect L, the image bearer such as the photoconductor 10 includes inorganic particles at the surface thereof.

According to this aspect, the wear of the image bearer is inhibited, thereby enhancing image quality, reliability, and durability of the electrophotographic image forming apparatus.

Aspect O: An image forming apparatus includes a charger, such as the charging device 40, to charge a surface of an image bearer, such as the photoconductor 10; an exposure device (140) to expose the surface of the charged image bearer to form an electrostatic latent image thereon; a developing device (50) to develop the latent image with toner into a toner image; a transfer device, such as the intermediate transfer unit 160 and the secondary transfer roller 165 to transfer the toner image onto a recording medium; a fixing device (30) to fix the toner image on the recording medium; and a cleaning device (1) to remove toner from the image bearer, and a lubrication device (70) to lubricate the surface of the image bearer; and the cleaning device includes the blade according to any one of Aspects E or F.

Numerous additional modifications and variations are possible in light of the above teachings. It is therefore to be understood that, within the scope of the appended claims, the disclosure of this patent specification may be practiced otherwise than as specifically described herein.

What is claimed is:

1. An elastic blade comprising:

an edge layer including a contact edge to contact a contact object and an opposing face to oppose the contact object; and at least one backup layer laminated on the edge layer and being greater in elastic power than the edge layer, wherein the at least one backup layer is greater in thickness than the edge layer, wherein the edge layer has an elastic power no less than 40%, and wherein the at least one backup layer has an elastic power no less than 70%.

2. The blade according to claim 1, further comprising a blade end face adjoining the opposing face via the contact edge, wherein the elastic power of the at least one backup layer measured from the blade end face is 70% or greater.

3. The blade according to claim 1, further comprising a blade end face adjoining the opposing face via the contact edge, wherein the elastic power of the at least one backup layer measured from the blade end face is greater than an elastic power of the edge layer measured from either the blade end face or the opposing face.

4. The blade according to claim 1, further comprising a blade end face adjoining the opposing face via the contact edge, wherein the elastic power of the edge layer measured from either the opposing face or the blade end face is 40% or greater.

5. The blade according to claim 1, wherein the contact edge is to contact a lubricated surface of the contact object.

6. The blade according to claim 1, wherein the edge layer has a Martens hardness of 1.0 $N/mm^2$ or greater.

7. The blade according to claim 6, wherein the edge layer is greater in Martens hardness than the at least one backup layer.

8. The blade according to claim 6, further comprising a blade end face adjoining the opposing face via the contact edge, wherein a Martens hardness of the edge layer measured from either the opposing face or the blade end face is greater than a Martens hardness of the at least one backup layer measured from the blade end face.

9. A cleaning device comprising:

the blade according to claim 1; and a pressing device configured to press the blade to the contact object, wherein the pressing device is configured to maintain a contact pressure of the blade with the contact object constant.

10. The cleaning device according to claim 9, wherein the at least one backup layer has an elastic power of 50% or greater.

11. An image forming apparatus comprising:

an image bearer configured to serve as the contact object;

a charger configured to charge a surface of the image bearer;

an exposure device configured to expose the surface of the charged image bearer to form an electrostatic latent image thereon;

a developing device configured to develop the latent image with toner into a toner image;

a transfer device configured to transfer the toner image onto a recording medium;

a fixing device configured to fix the toner image on the recording medium; and a cleaning device configured to remove toner from the image bearer, the cleaning device including the blade according to claim 1.

12. The image forming apparatus according to claim 11, wherein the charger applies AC voltage to the surface of the image bearer.

13. The image forming apparatus according to claim 11, wherein the image bearer comprises inorganic particles at the surface thereof.

14. An image forming apparatus comprising:

an image bearer configured to serve as the contact object;

a charger configured to charge a surface of the image bearer;

an exposure device configured to expose the surface of the charged image bearer to form an electrostatic latent image thereon;

a developing device configured to develop the latent image with toner into a toner image;

a transfer device configured to transfer the toner image onto a recording medium;

a fixing device configured to fix the toner image on the recording medium;

a cleaning device configured to remove toner from the image bearer, the cleaning device including the blade according to claim 1; and a lubrication device configured to lubricate the surface of the image bearer, wherein the edge layer has an elastic power of 30% or greater.

15. The blade according to claim 1, wherein a difference in elastic power between the edge layer and the backup layer is from about 5% to 50%.

* * * * *